Aug. 30, 1932.  E. A. HOLMGREN  1,874,532
INSOLE MAKING MACHINE
Filed Sept. 28, 1928  20 Sheets-Sheet 19

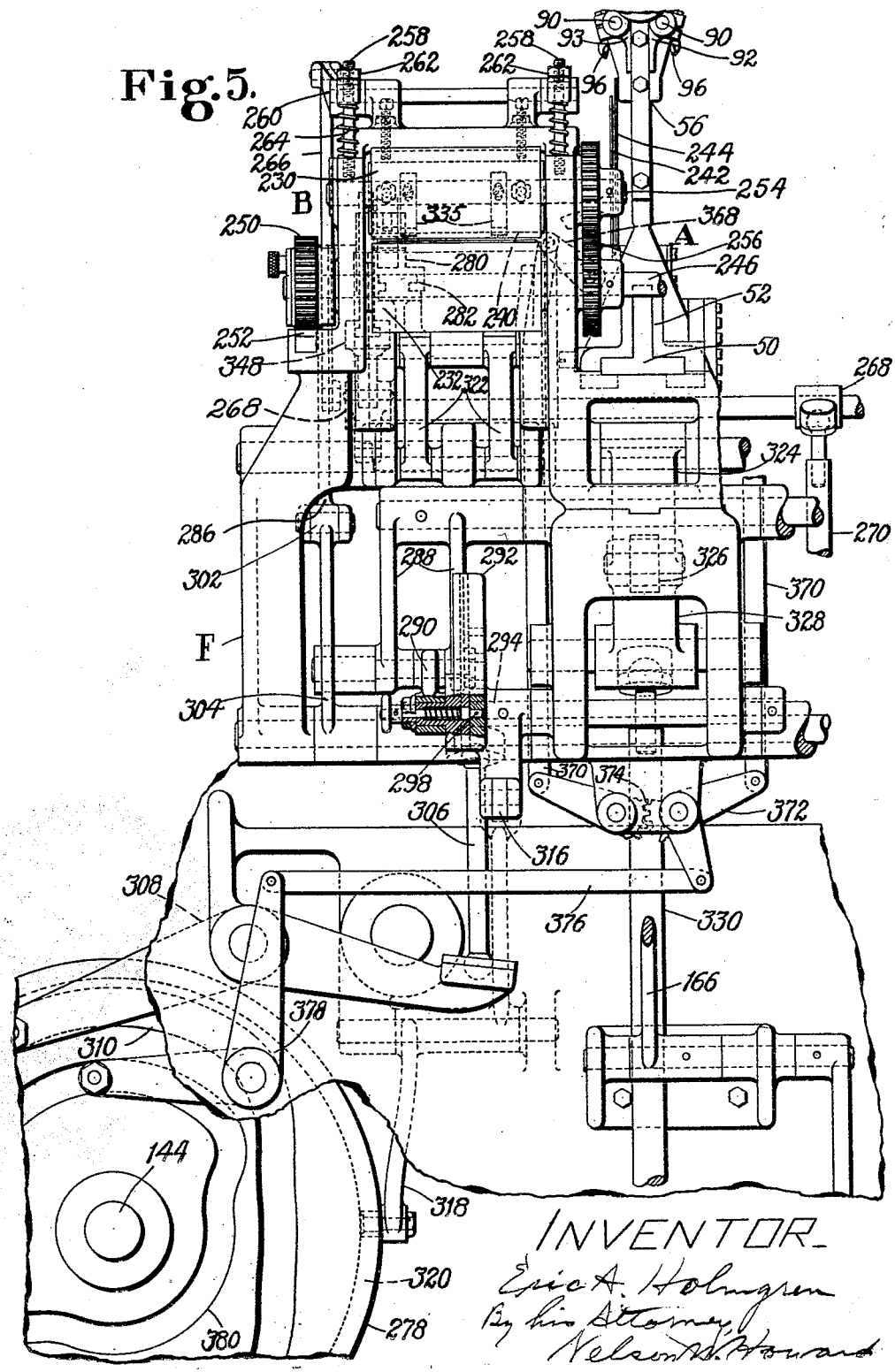

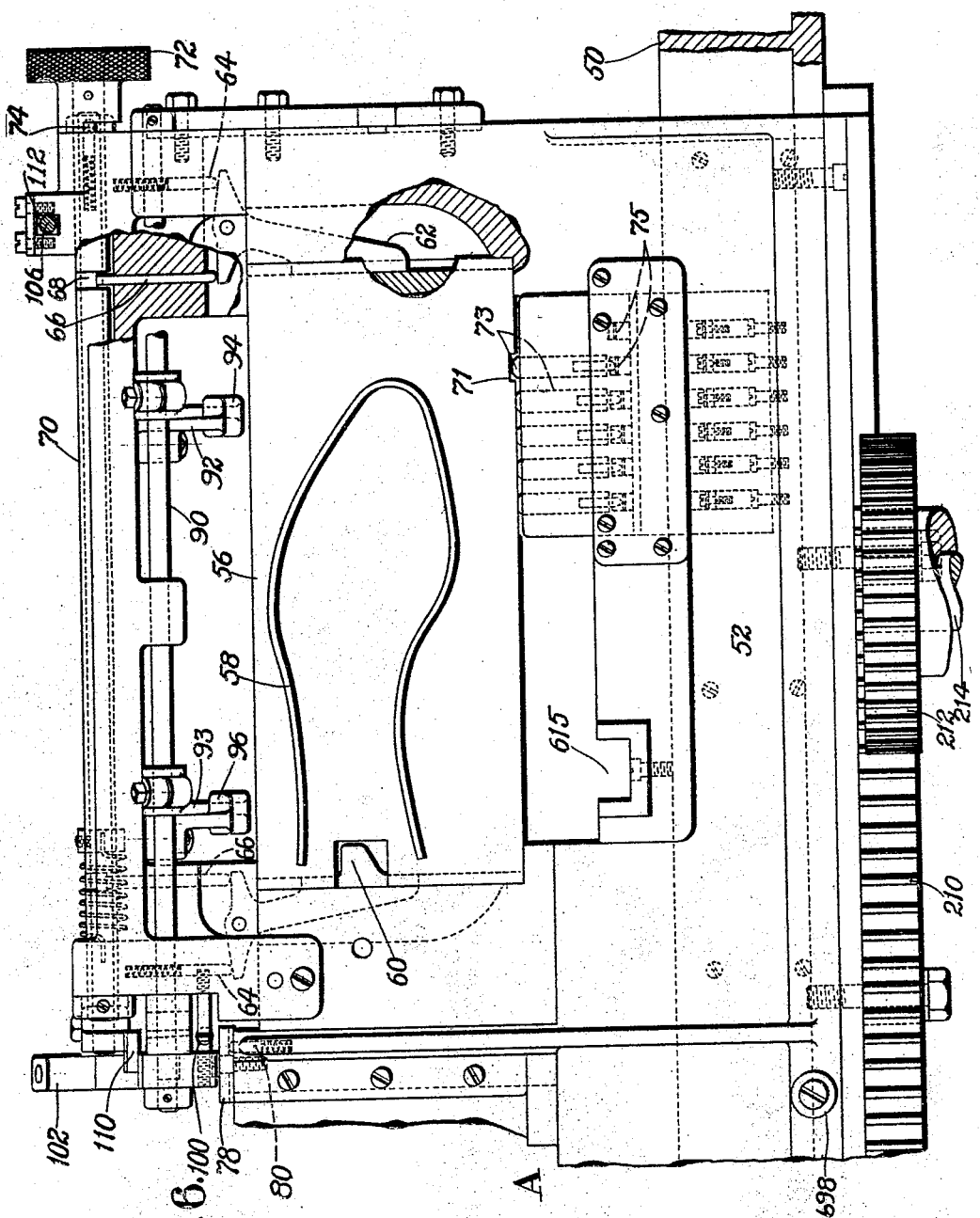

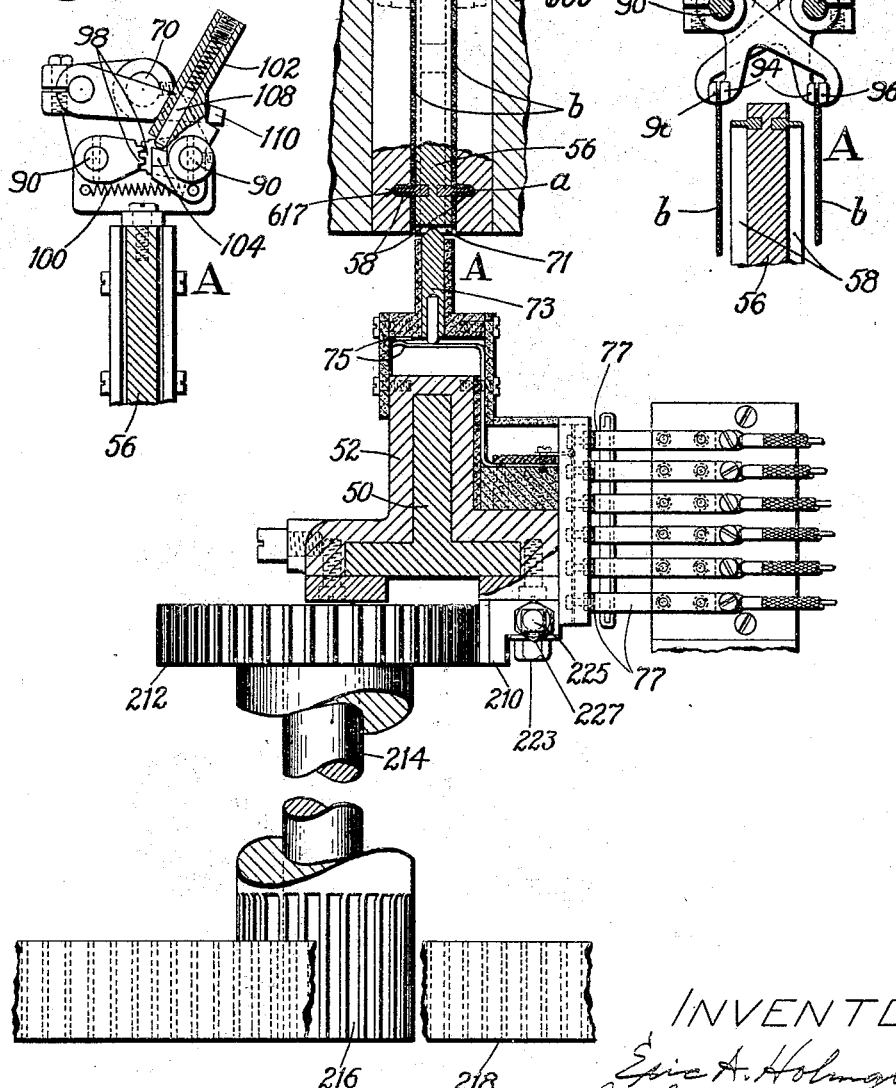

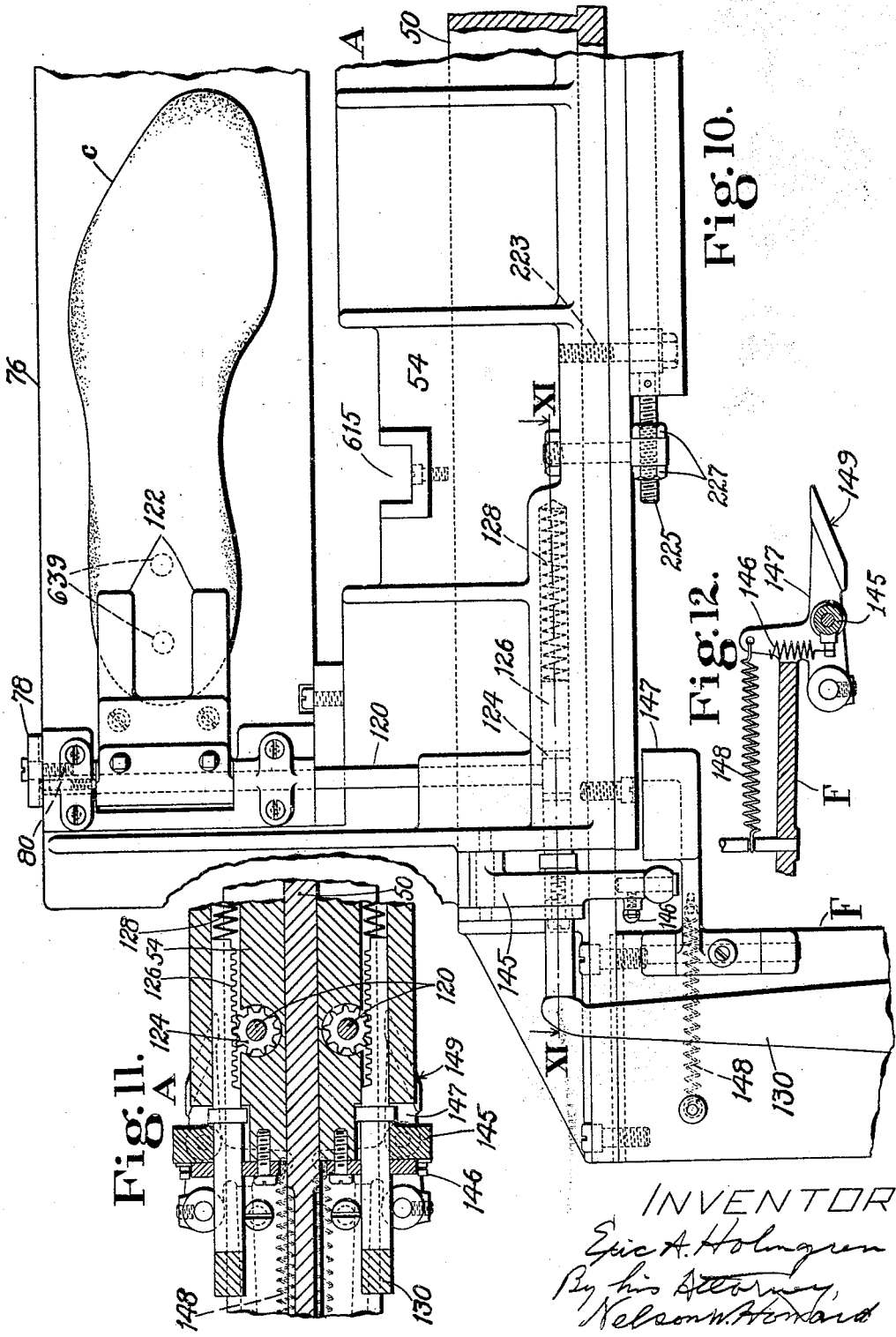

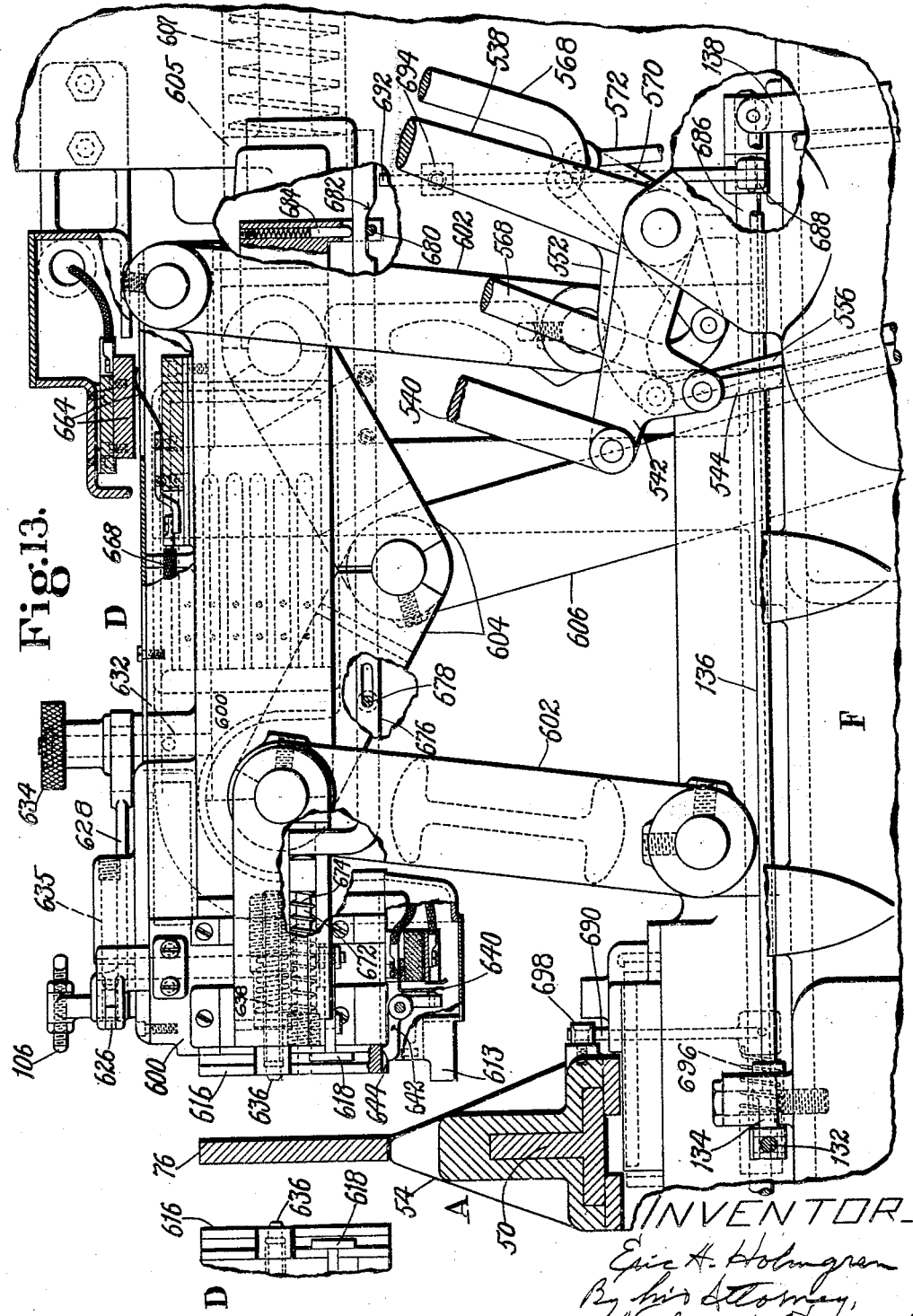

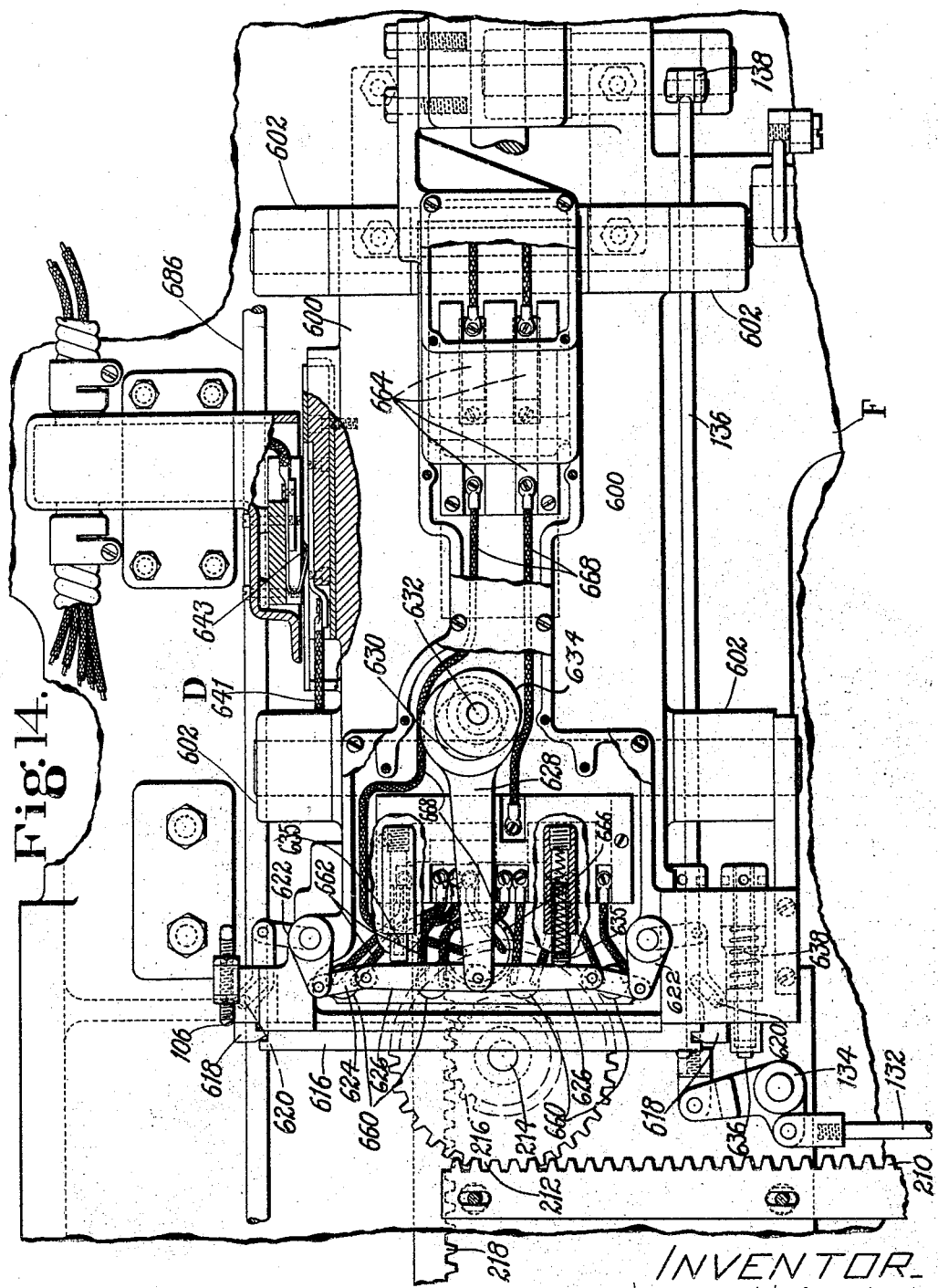

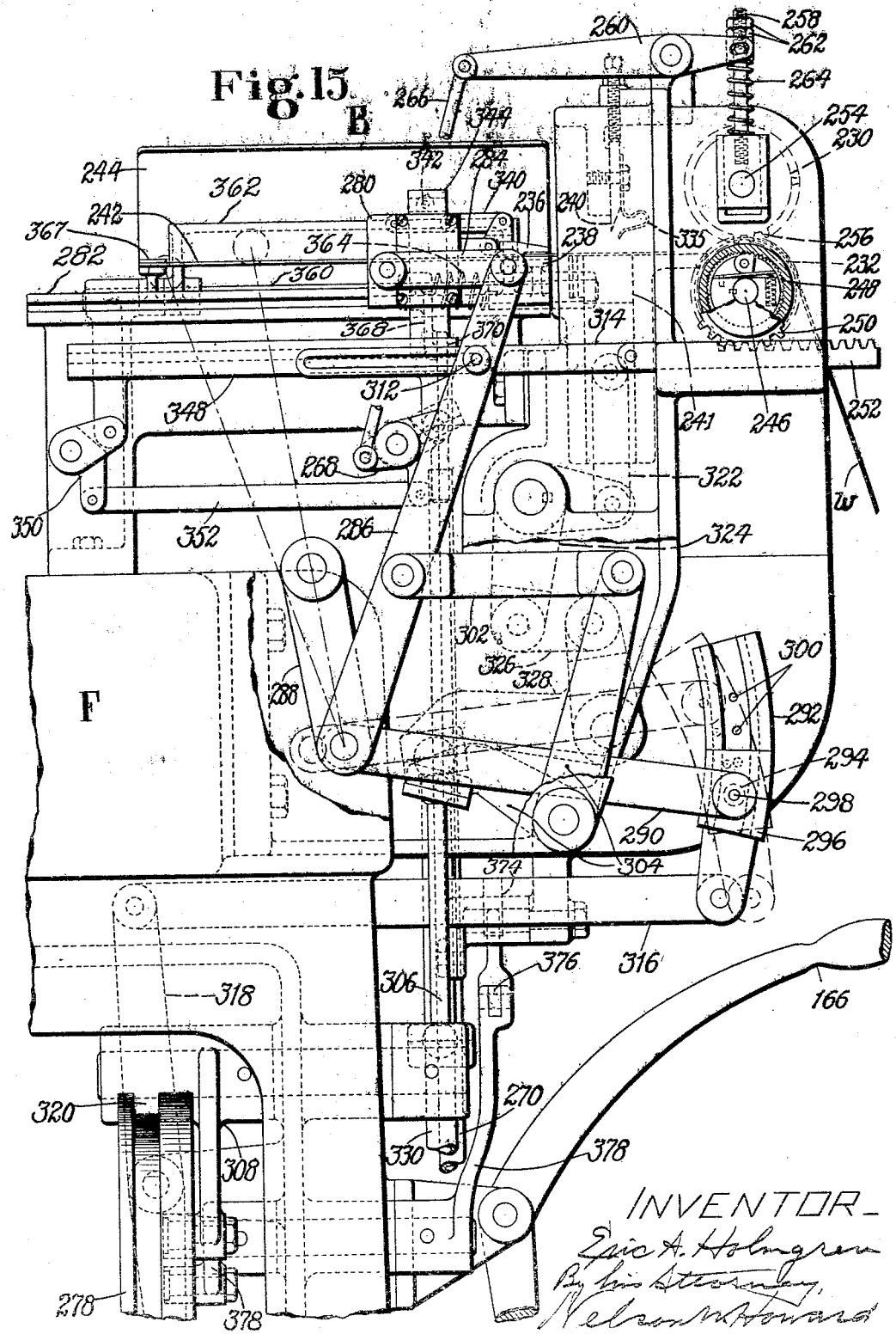

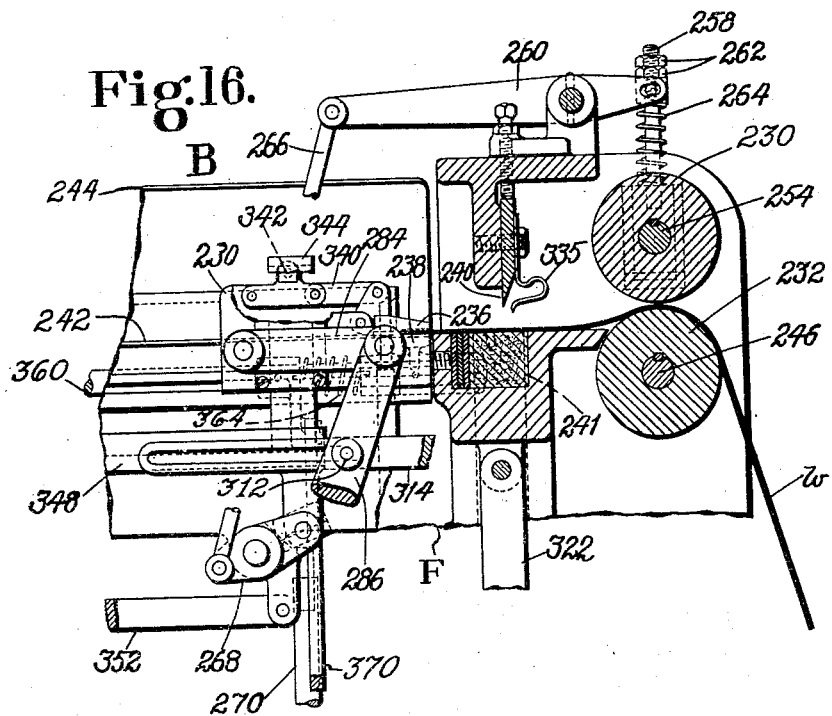
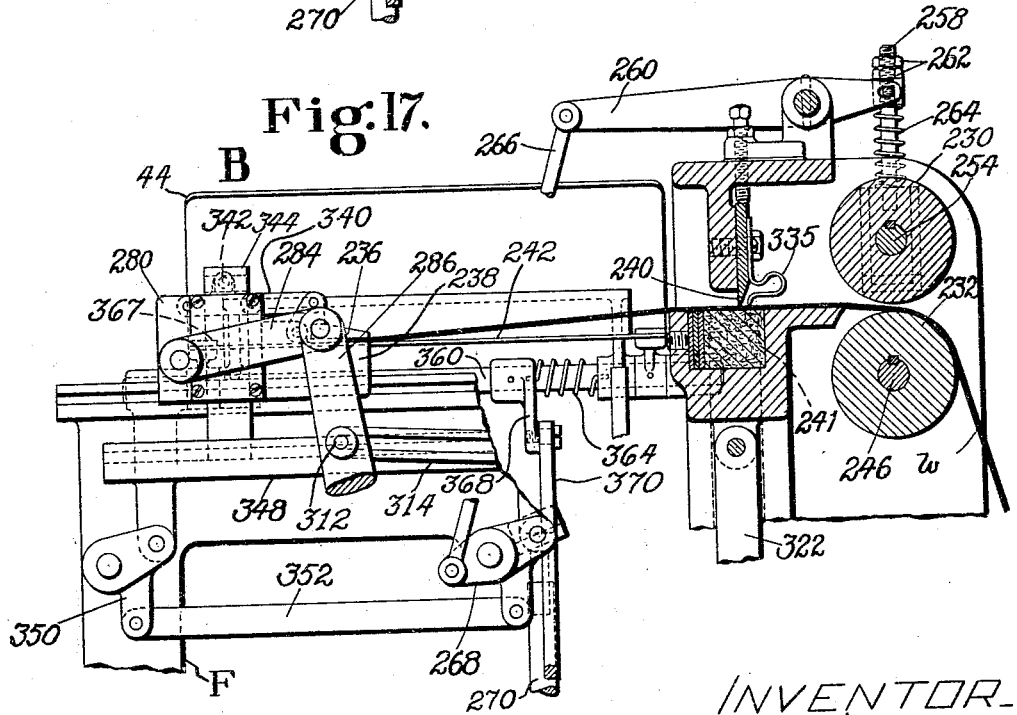

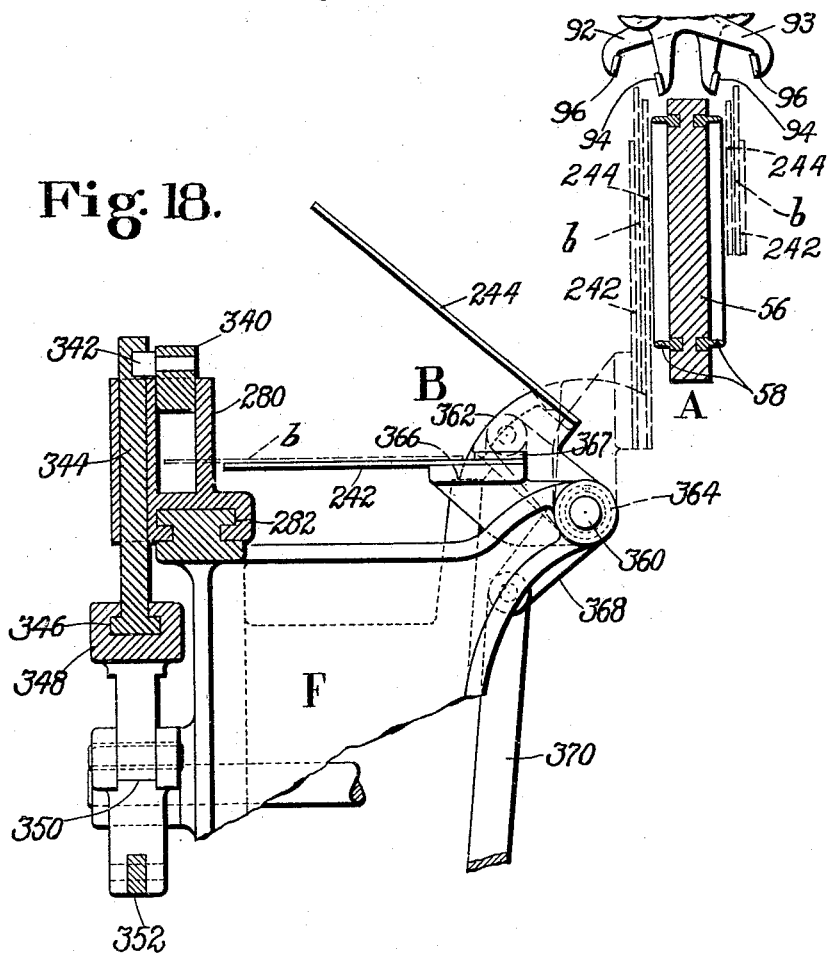

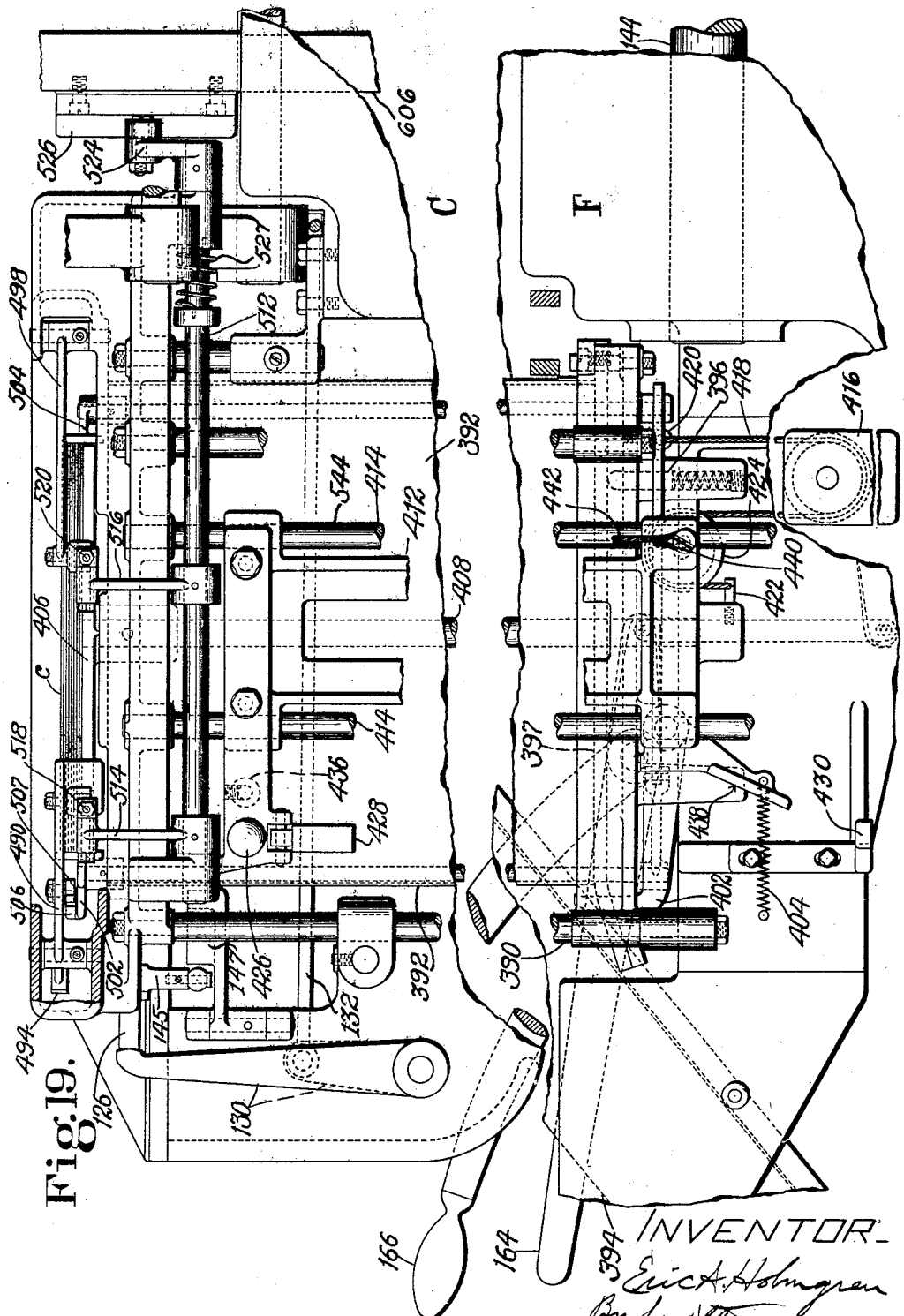

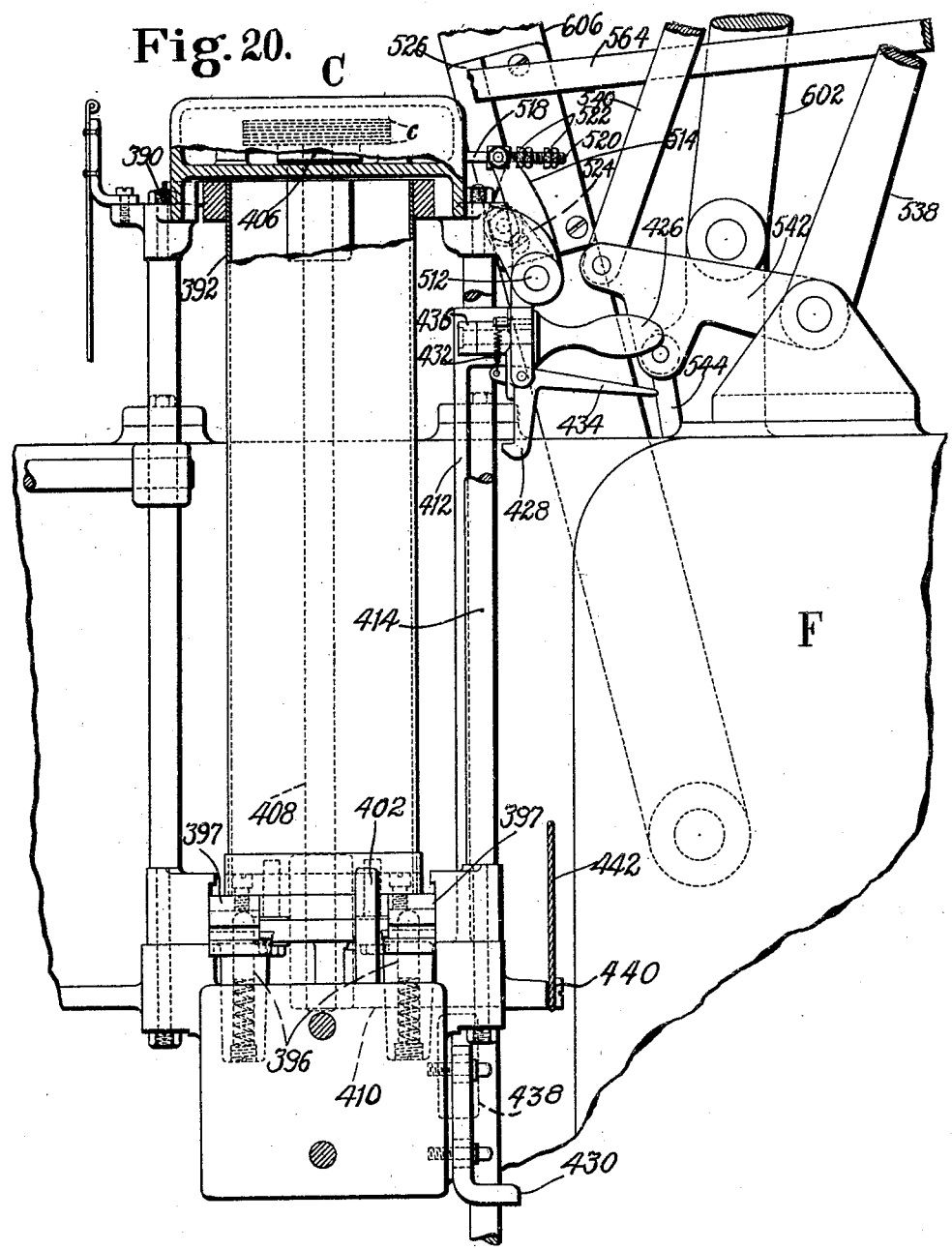

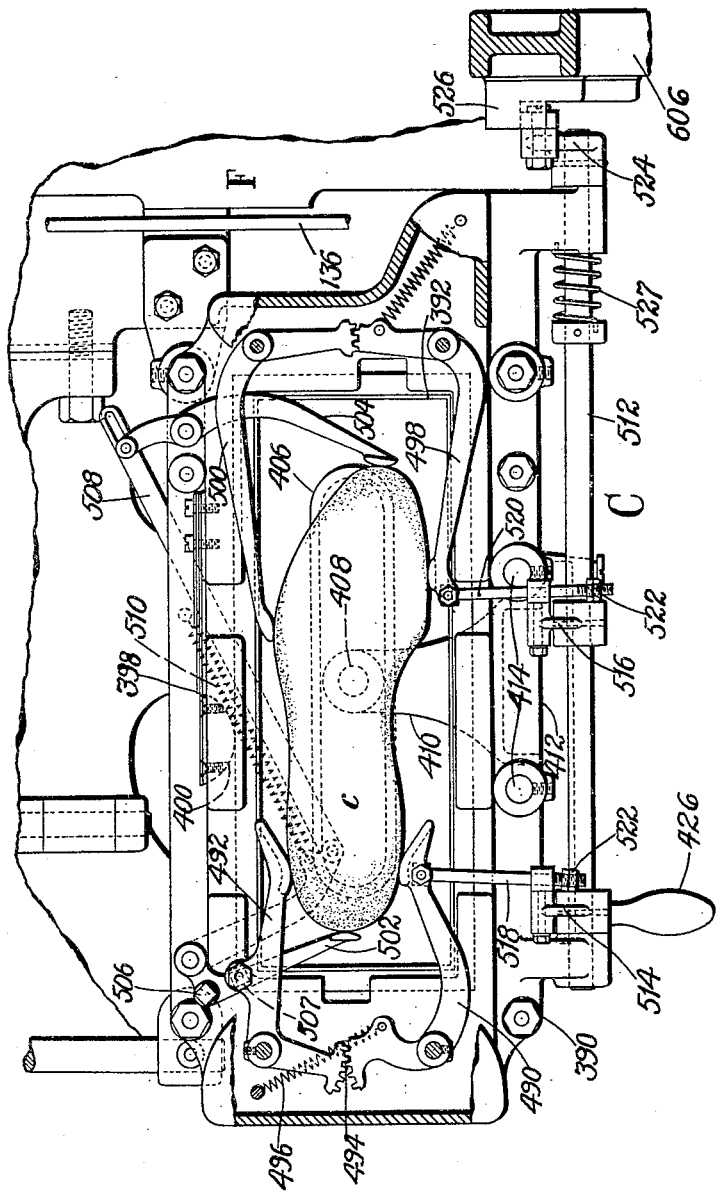

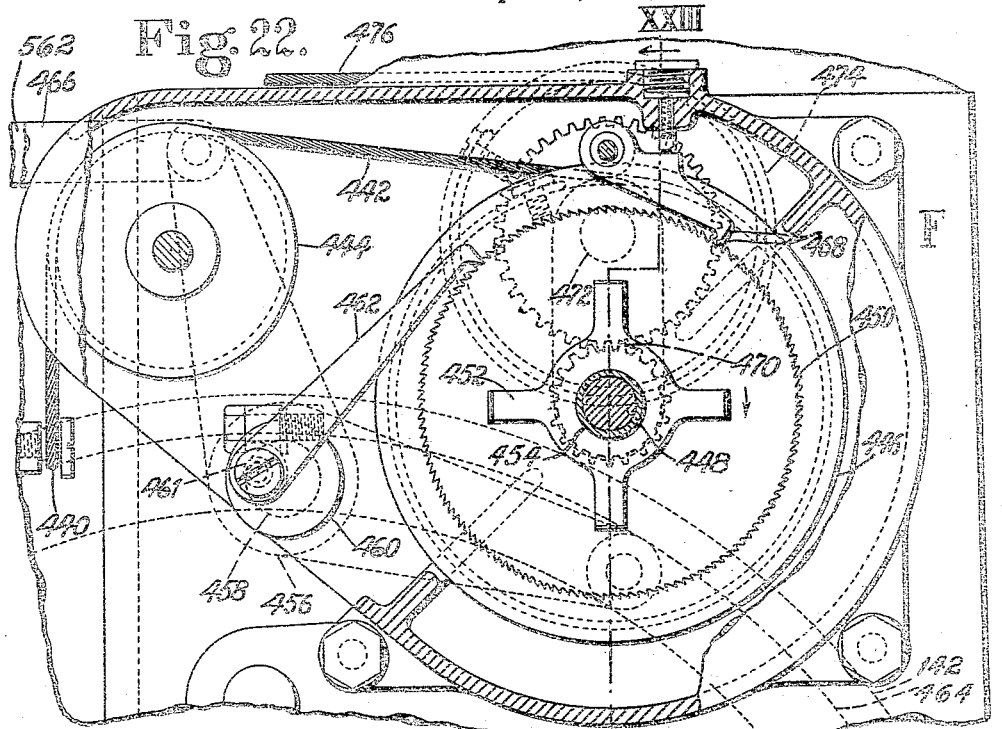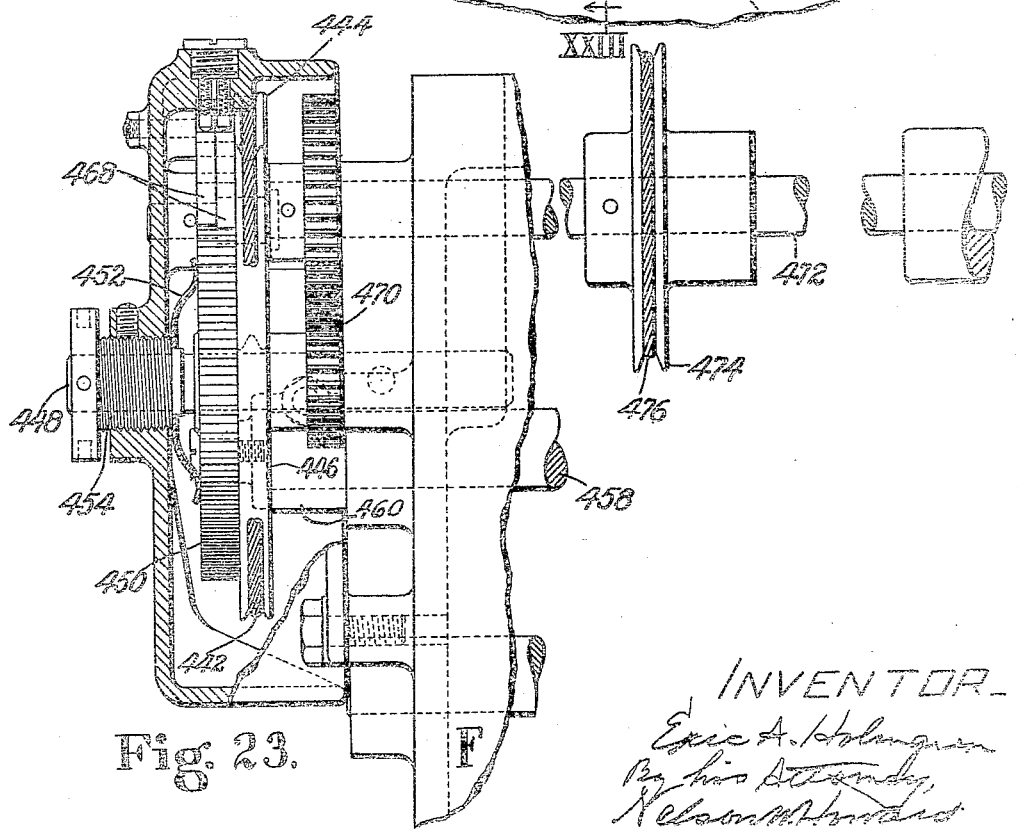

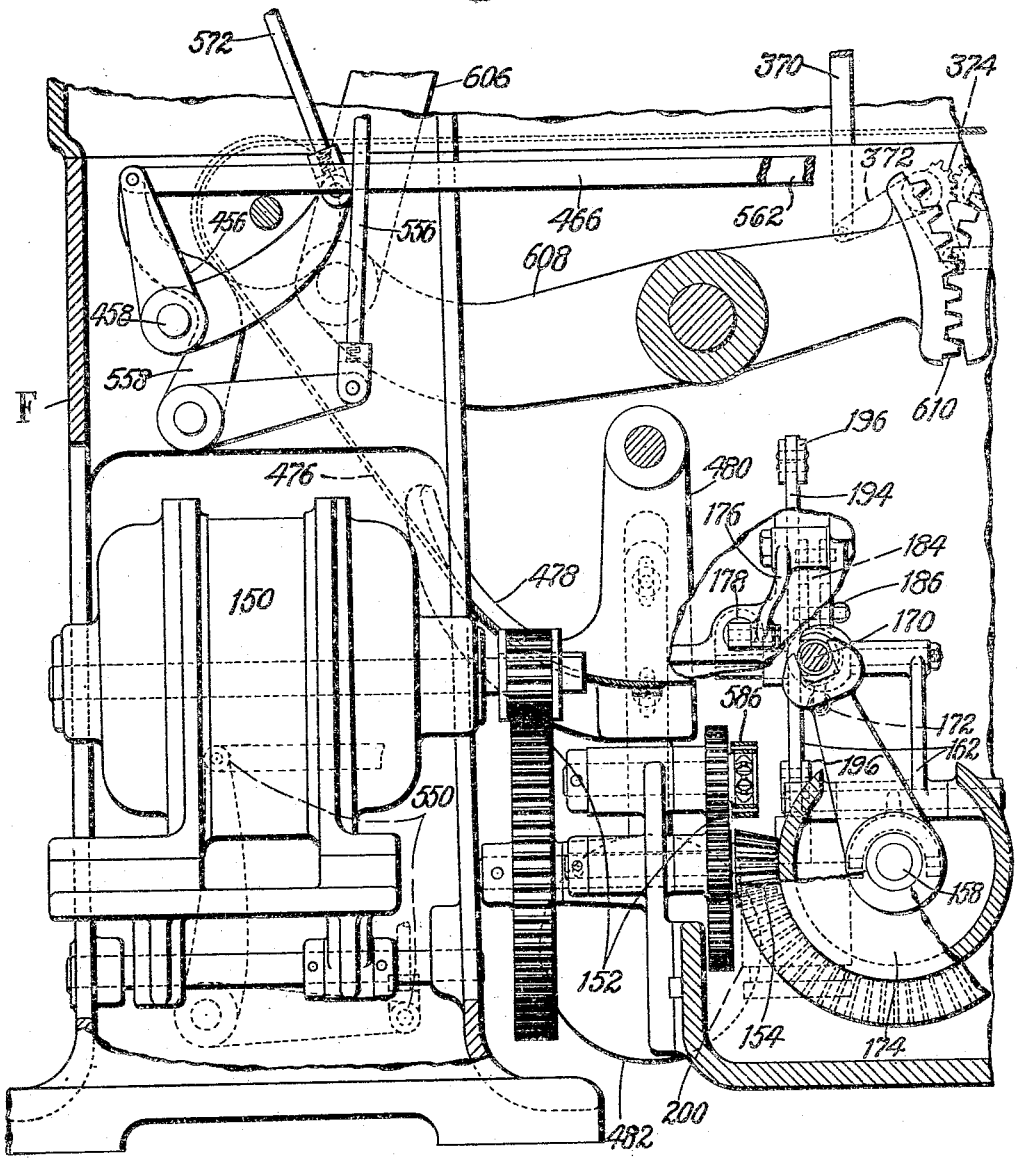

INVENTOR
Eric A. Holmgren
By his Attorney
Nelson W. Howard

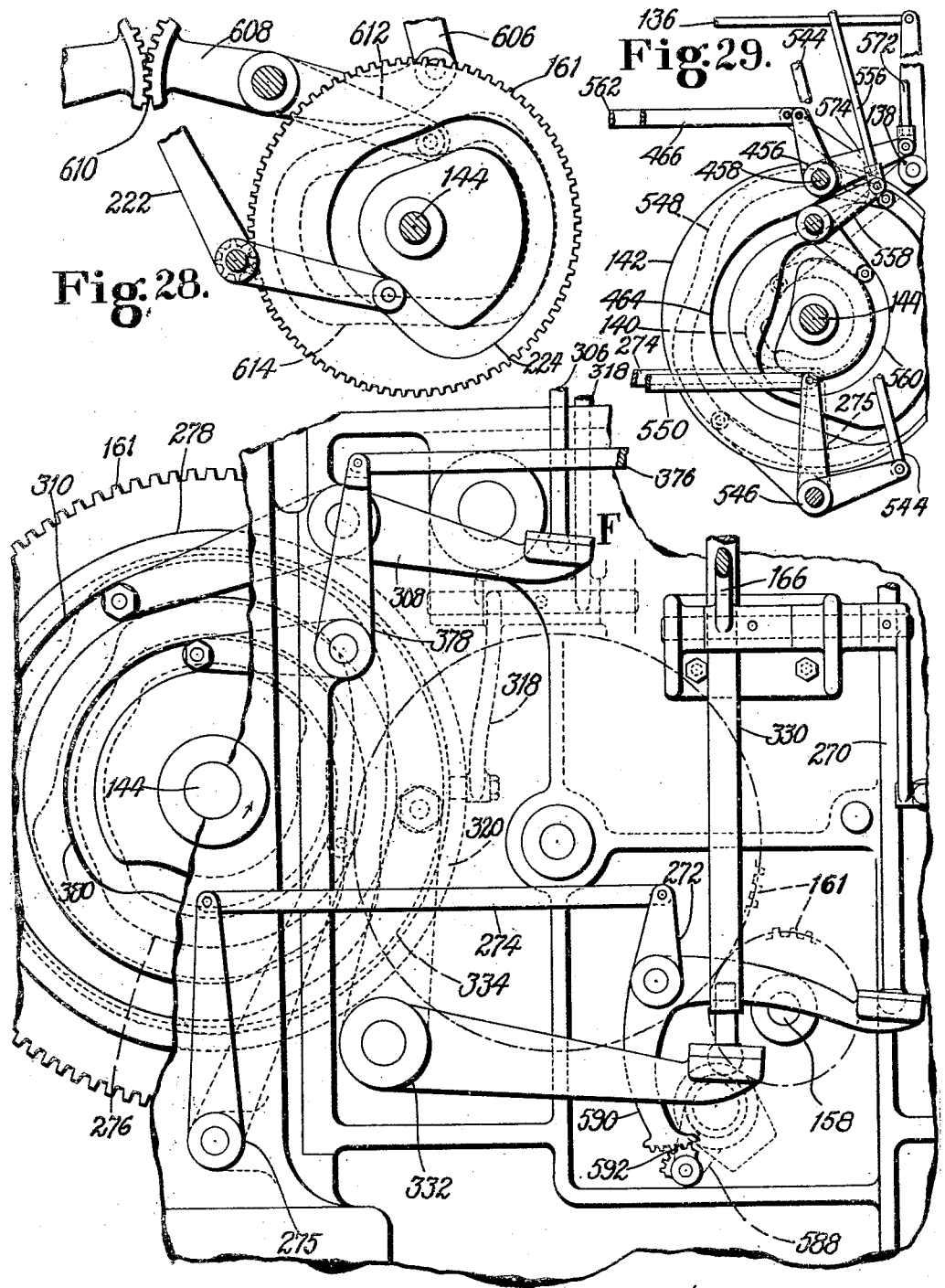

Patented Aug. 30, 1932

1,874,532

UNITED STATES PATENT OFFICE

ERIC A. HOLMGREN, OF LYNN, MASSACHUSETTS, ASSIGNOR TO UNITED SHOE MACHINERY CORPORATION, OF PATERSON, NEW JERSEY, A CORPORATION OF NEW JERSEY

INSOLE-MAKING MACHINE

Application filed September 23, 1928. Serial No. 309,021.

My invention relates to machines for producing such portions of shoes as composite insoles, and is particularly applicable to the type of apparatus disclosed in Letters Patent of the United States No. 1,667,951, issued May 1, 1928, and which deals with the joint invention of Ernest E. Sabin and myself. In the organization of this patent, a carrier, provided with a plurality of work-holding sections, moves to present these sections at three positions, where blank-feeding, rib-molding and assembling operations are performed.

An objection of the present invention is to improve generally the efficiency and convenience of machines of the character referred to above. To this end, I provide novel means for mounting the pressure or die-plates upon their carrier and upon the co-operating pressure member or ram, for securing said plates in place, and for preventing the starting of the machine until they have been properly matched on the carrier and ram. The changing of the plates is thereby greatly facilitated, and danger of their breakage is removed. New feeding means are made a part of the apparatus, both for supplying the fabric-pieces and the leather- or body-pieces of the composite insoles. In the former means, the feeding operation is rendered more effective by advancing the fabric in a web, pieces being measured according to the size of the insole to be produced, cut from the web and transferred to the carrier for the operations upon them. The body-pieces are preferably fed from a magazine, with which is associated means for assuring their correct position preparatory to their transfer to the carrier. This transfer is effected by improved means, which takes the pieces from a horizontal relation in the magazine and delivers them vertically upon the operating surface. At both sections of the carrier to which the fabric- and body-pieces are respectively supplied, novel means are furnished for releasably holding said pieces in place for the operations upon them. The dies are heated to a predetermined degree, so they may effectively set the rib which they mold in the fabric without danger of burning it. The completed work is ejected from the operating mechanism by means so actuated that it is effective for only a portion of plural operations. The ram of the operating mechanism may thus both act to form the rib in the fabric-piece and assemble this molded fabric with a body-piece, the ejection being performed only after the assembling operation. Other features of the invention will be apparent upon consideration of the following detailed description and appended claims.

In the accompanying drawings illustrating the invention in one of its many possible forms, Figs. 1 and 2, taken together, with Fig. 1 at the left, furnish a side elevation of the machine;

Figs. 3 and 4, similarly arranged, form an end elevation;

Fig. 5 is a partial end elevation looking from the right in Fig. 2;

Fig. 6 is a broken side elevation of the rib-molding section of the carrier;

Fig. 7 is a partial vertical section taken transversely through Fig. 6;

Fig. 8 is a detail, in broken end elevation, of the upper portion of Fig. 7, illustrating particularly the means for releasing the fabric-clamping jaws on the carrier;

Fig. 9 shows said jaws by a section taken transversely of the carrier;

Fig. 10 illustrates, in elevation, the opposite end of the carrier from that appearing in Fig. 6;

Fig. 11 is a horizontal sectional detail on the line XI—XI of Fig. 10;

Fig. 12 shows a portion of the actuating means for the leather-piece-clamping fingers, the view being a broken top plan;

Fig. 13 illustrates one of the pressure-rams in side elevation, the carrier being in section;

Fig. 14 is a broken top plan view of a ram;

Fig. 15 shows the fabric-feeding end of the apparatus in broken side elevation;

Figs. 16 and 17 are vertical, longitudinal sectional details illustrating successive steps in the operation of the fabric-feeding mechanism;

Fig. 18 shows, in transverse section, the mechanism for transferring the severed pieces of fabric to the carrier;

Fig. 19 is a broken side elevation of the leather-piece magazine;

Fig. 20 is a broken end elevation, partly in section, of said magazine;

Fig. 21 illustrates the magazine by a top plan view;

Fig. 22 is a sectional detail through a portion of the elevating mechanism for the stack of leather-pieces;

Fig. 23 shows the same elements by a section taken generally on the line XXIII—XXIII of Fig. 22;

Fig. 24 illustrates the driving elements of the machine in end elevation;

Fig. 27 shows, in side elevation, one of the groups of cam-actuated elements; and Figs. 28 and 29 show other cam-actuated groups.

Figure 1:
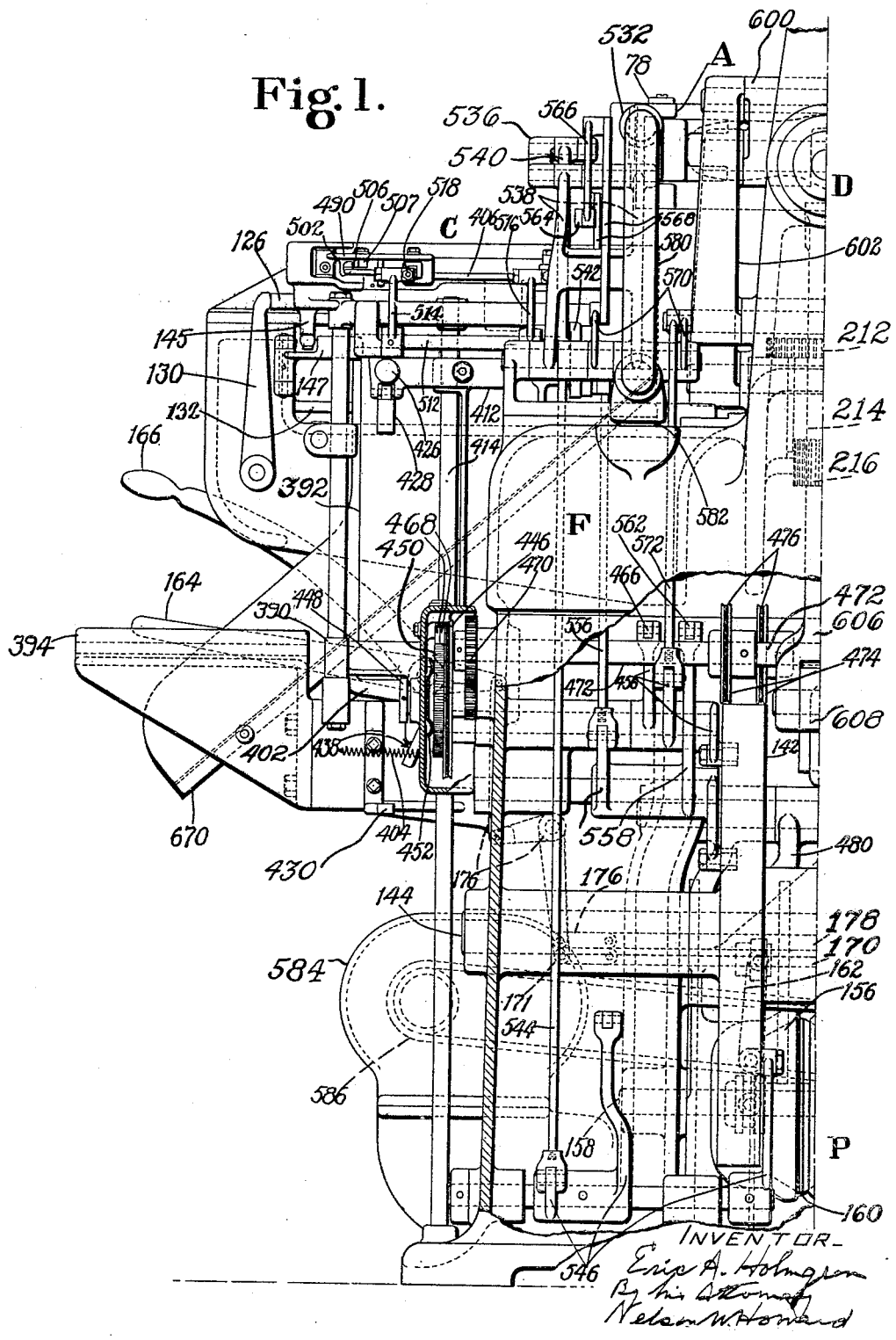

Upon a frame F are supported the various elements of the illustrated insole-making machine, the principal groups of which furnish carrying mechanism A, by which the work is transferred from one operating position to another and which shares in the insole-forming effects; feeding mechanism B, by which a layer of fabric is supplied to the carrier for the operation upon it; feeding mechanism C, similarly supplying the carrier with the body-layer of the insole; and the pressure mechanism D, effecting the formation and assembling of the work-pieces. Since two insoles, a right and a left, are preferably produced simultaneously, the carrying mechanism has opposite receiving and forming surfaces, and the mechanisms B, C and D at the successive operating positions are correspondingly duplicated.

To describe first the carrying mechanism, and referring particularly to Figs. 4, 6, 7 and 10 of the drawings, there is carried horizontally upon the frame an inverted T guide-rail 50 (Fig. 7), upon which is mounted for reciprocation the carrier-slide A. This carrier has two distinct supporting and operating sections 52 (Fig. 6) and 54 (Fig. 10) occupying the opposite extremities of the slide. In the first of the sections, near its opposite extremities, are spaced vertical ways to receive a die-plate 56 preferably slotted at its faces to the outline of the insole-rib. In each slot, a metal band 58 is so inserted as to project from the plate, and these are arranged to form or mold, respectively, the sewing-rib for a right and a left insole. To the opposite substantially parallel faces of the die-plate are applied pieces $b$ of some such fabric as canvas of sufficient size to furnish a layer of a composite insole, including a rib $a$ formed in the canvas. This canvas blank may be of less length than the insole of which it is to be a part, the heel-portion being omitted. The die-plate 56 is retained in place upon the carrier-section at the bottom of its ways by latches 60 and 62 engaging recesses in its opposite ends. The latch 60 and its recess are at one side of the longitudinal center of the ways and higher than the latch 62, and serve to insure that the plate shall be inserted with the rib in the correct relation, since, if the plate is upside down or reversed longitudinally, the latch will not enter the recess. Normal engagement of each latch with the corresponding plate-recess is effected by a spring-actuated plunger 64 contacting with an arm of the respective latch. Upon an opposite arm from that acted upon by the plunger rests a vertical rod 66, movable in the top of the section 52. The upper extremity of the rod lies in proximity to the eccentric portion 68 of a spindle 70 journaled longitudinally in the section. At the outer extremity of the spindle is secured a finger-piece 72, which, when turned, rotates the shaft, causing the eccentric portions to depress both of the rods 66 and thus throw the latches out of their recesses against the pressure of the plungers 64. This permits the die-plate 56 to be withdrawn, and that for an insole of another size inserted. A spring-plunger 74, movable horizontally in the carrier-section 52, contacts with the adjacent face of the finger-piece to hold this at either of its extremes of movement. For each size of insole, a different plate 56 will be employed, each plate of the set having upon it a projection 58 corresponding in contour to the rib of the insole which it is to mold. Each plate has in its lower edge a depression or depressions 71, differing in location from those in all plates for producing other insole-sizes. The particular form of each plate-edge causes it to depress all but a selected one or a group of a series of plungers 73 urged toward the plate by one of a series of pairs of electrical contacts 75, 75. When one of the plungers is alined with a depression and may be raised by the co-operating contact, the corresponding pair of contacts is closed. The unbroken edge of the plate holds the contacts open. Three contacts control circuits joined to the carrier-contacts by fixed and movable contacts 77 (Fig. 7), which, in turn, govern the starting of the machine under power, permitting it to be put into operation only when the plate 56 and complemental dies of the same size in the pressure mechanisms D, D are in place. On account of the co-operative action of the portions of the circuit controlled by the two rib-molding elements, this feature of the invention will be considered in detail after a pressure mechanism D has been described. In vertical ways in the carrier-section 54 is held a plate 76 having opposite parallel plane surfaces, to which are supplied pieces c of leather or a leather-like material, these pieces being of such area that they may be trimmed to furnish, after they have been assembled with the ribbed canvas pieces, completed insoles. The canvas or the leather pieces, preferably the former, may bear upon one face a coating of an adhesive such as latex, which, while not interfering with the preliminary operations upon them, will become adhesive under proper conditions of pressure and temperature. The plate 76 is made removable, so it may be replaced in case of breakage or mutilation, being latched in its ways by buttons 78, 78 (Figs. 6 and 10) pivoted upon the upper edge of the section 54 adjacent to the ways. The buttons may be retained against turning accidentally by plungers 80 movable in the carrier and spring-pressed against the under faces of said buttons.

To hold the canvas pieces b in place upon the die-plate 56 for the rib-forming operation, there is mounted at the top of the carrier-section 52 a grasping device, illustrated in detail in Figs. 6 to 9, inclusive. Journaled in the carrier, above each face of the plate 56, is a shaft 90, having fast upon it members 92 and 93 furnishing the inner jaw 94 of the grasping means for one side of the die-plate and the outer jaw 96 for the opposite side. Gear-segments 98, 98 connect the shafts so they are compelled to move together. The jaws are held normally separated, to receive the work-pieces between them, by a spring 100 joining to the carrier a lever 102 arranged to turn about the shaft of the member 93, a horizontally extending arm of the lever being forced against a projection 104 from the side of the gear-segment of the member 93. To close the pairs of jaws upon the work-pieces presented to them, an upwardly extending arm of the lever 102 receives the contact of an adjustable member 106 (Figs. 4 and 7) upon one of the pressure mechanisms D while this is assembling the insole-layers upon the carrier-section 54, the rib-forming section 52 at this time being in canvas-receiving co-operation with the mechanisms A. The pressure-applying travel of the mechanisms D will be later more fully developed. In the upper arm of the lever 102 is a spring-actuated plunger 108, which rests against the segment-projection 104. The yield of this plunger, when movement is being transmitted by the lever 102 to the projection 104 of the gear-segment, and therefore to the jaws, allows any excess of travel of the member 106 to be absorbed without injury to the co-operating parts. The jaws are locked with the canvas grasped between them by a latch 110 pivoted upon the carrier and having a hooked end engaging the outer side of the lever 102. Connected to an arm of the latch is a slide 112 movable horizontally in the carrier. When the carrier is so shifted that the section 52 carrying the canvas pieces is in co-operation with the pressure mechanisms D, the slide is brought into alinement with the contact member 106 which previously acted upon the lever 102. Consequently, as these mechanisms act to mold the ribs in the canvas pieces, the member 106 moves the slide and thereby lifts the latch to free the lever, allowing the spring 100 to separate the jaws and release the canvas.

Associated with opposite sides of the assembling plate 76 at carrier-section 54 is means for temporarily holding the body-layers c of the insoles in position to have the ribbed canvas pieces pressed against them by the mechanisms D. This is particularly shown in Figs. 10, 11 and 12. Journaled vertically at the outer extremity of the carrier-section 54, and at each side of the plate 76, is a spindle 120, having fast upon it a pair of resilient fingers 122. These are so located that they will engage the piece c upon the plate at the heel-portion beyond the area to be covered by the canvas piece b, and at opposite sides of points at which are to be formed openings adapted to locate the insoles in machines for succeeding manufacturing operations. Secured to the lower end of each spindle 120 is a pinion 124 meshing with a rack 126 arranged to slide horizontally in the carrier A. Between the rack and carrier is interposed a spring 128, which acts to so turn the spindle that the fingers 122 are urged away from the plate 76. When the plate is brought by the carrier into position to receive the pieces c from the feeding mechanisms C, the outer end of each rack is in proximity to an actuating arm of a three-armed lever 130 (Fig. 1) fulcrumed upon the main frame. A rod 132 (Figs. 14 and 19) joins this lever to a bell-crank lever 134, and this is connected by a rod 136 to a bell-crank lever 138 (Fig. 29), all these levers turning on the frame F. The lever 138 carries a roll entering a cam-groove 140 in a disk 142 secured to a cam-shaft 144 rotatable near the bottom of the frame and longitudinally thereof, and driven continuously during the operation of the machine. Normally, as previously pointed out, the fingers 122 are withdrawn from the plate 76 in work-receiving position. As the mechanisms C place pieces c against opposite sides of the plate, the cam 140 causes the fingers to close against the pieces and hold them pressed against the plate for the assembling operation. In this retaining relation, each pair of fingers is temporarily held by a latch 145 (Figs. 10 and 11) pivoted upon the carrier and drawn by a spring 146 behind an enlargement upon the rack 126 when this is at its inward extreme of movement. As the carrier travels to present the plate 76 at the assembling position, the lower arm of the latch passes idly by the inner side of a switch-cam 147 pivoted upon the frame F near the lever 130 at one extreme of travel of the carrier and held yieldably toward the frame by a spring 148. Upon the opposite travel of the carrier, with the completed insole upon the plate 76, a surface 149 of the cam receives contact of the arm of the latch to retract this. The rack is thereby freed, permitting the spring 128 to open the fingers 122 for the release of the piece c, which now bears, adhering to it, the ribbed piece b.

Figure 2:
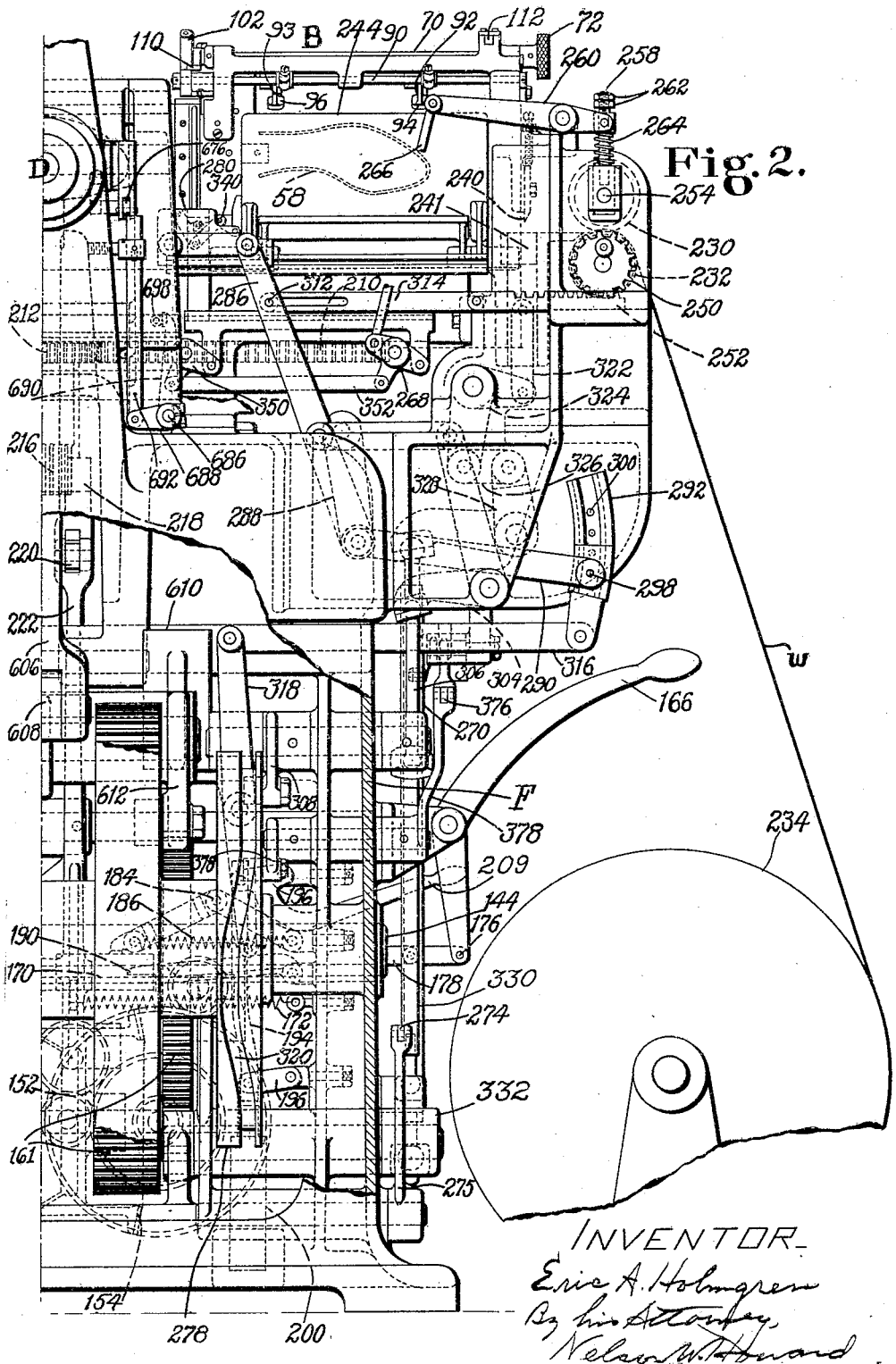
Figure 3:
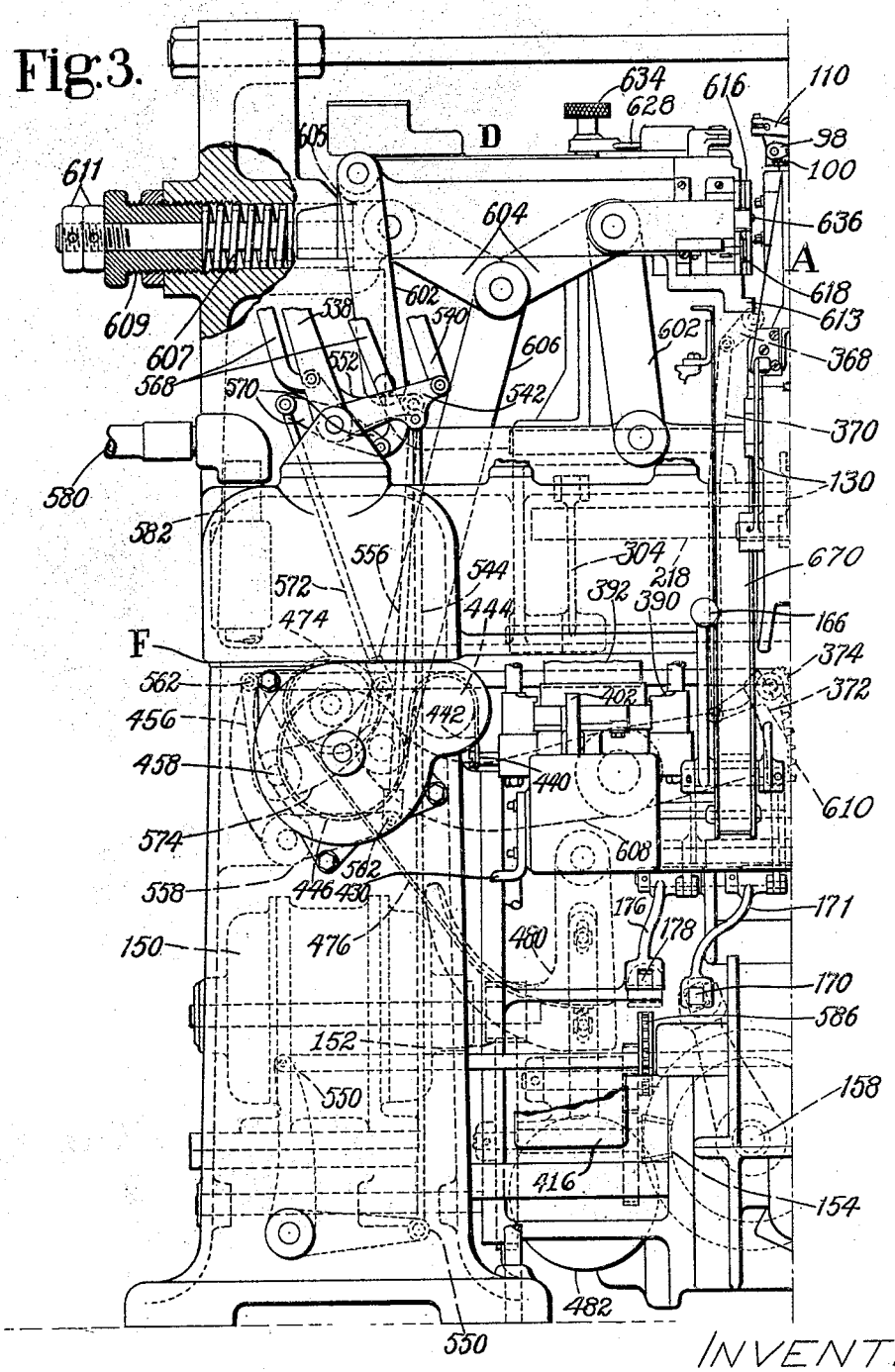
Figure 25:
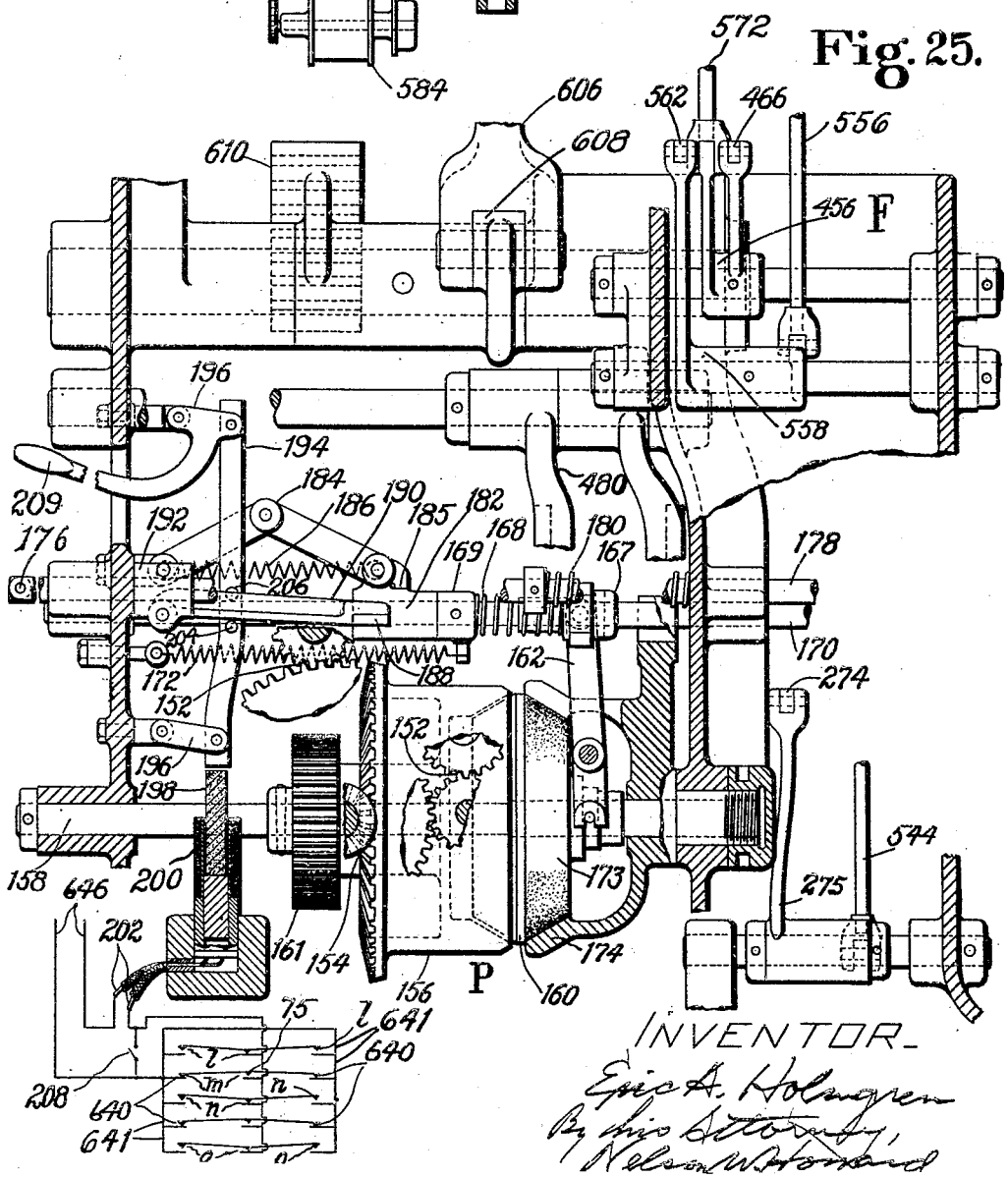
Fig. 25 shows a portion of these elements, looking from the left in Fig. 24.

The following mechanism may be employed for rotating the cam-shaft 144 and other primary actuating elements of the apparatus. Mounted upon the frame is an electric motor 150 (Figs. 24 and 26), which, through reducing gearing 152 and bevel-gearing 154, drives a member 156 of a clutch P. The clutch member 156 turns about a shaft 158 rotatable in the frame below the cam-shaft 144, and may be joined to the first-mentioned shaft by a driven member 160 of the clutch P. Reduction-gearing 161 unites the power-shaft 158 to the cam-shaft 144. Engagement of the clutch is governed by a lever 162 fulcrumed upon the frame and arranged to be shifted by a hand-lever 164 (Fig. 1) at one end of the frame, by which an intermittent or inching operation of the apparatus may be obtained through continued actuation of the lever 164, or by either of two hand-levers 166 (Figs. 1 and 2) at opposite extremities of the frame and which produce continuing operation. The lever 162 extends between a collar 167 and a spring 168 backed by a collar 169, both collars being fixed to a short horizontal rod 170 arranged to slide in the frame and united to the lever 164 by connections 171 (Fig. 3). A spring 172, joining to the frame the collar 169, maintains the clutch normally disconnected. Movement of the driven clutch member 160 to the left, as viewed in Fig. 25, by means of the hand-lever 164, brings it into engagement with the driving member 156 of the clutch, and allows a gradual motion to be imparted to the elements of the machine, as for the purpose of testing. When the lever 162 is released, the spring 168 carries the driven member out of engagement with the driving member, and at the same time brings a surface 173 of the driven member into frictional engagement with a relatively fixed element 174 to produce a braking effect. Connections 176 unite the two levers 166 to the opposite ends of a rod 178 movable in the frame adjacent to the rod 170. A spring 180, surrounding the rod 178, forces it normally to the left (Fig. 25). About the primary rod 170 is a collar 182 connected to the frame by a toggle-lever 184. A spring 186 exerts its tension to draw in the collar 182 to an extent determined by the engagement of an end 185 of the lever with said collar. From one side of the collar 182 is a projection 188, with which may contact the recessed end of an arm 190 pivoted upon a collar 192 fixed upon the rod 178. A bar 194 is mounted to reciprocate vertically upon links 196, 196 pivoted upon the frame F, the bar, at its lower end, having a plunger 198 operating within a solenoid 200. The solenoid is fixedly mounted upon the frame and included by conductors 202 in a controlling circuit. With the solenoid energized, as will be the case if other than properly matched dies are applied to the carrier-section 52 and to the pressure mechanisms D, the plunger will be drawn up and a pin 204, projecting from the side of the bar, is forced against the under edge of the arm 190. This raises the arm away from the projection 188, so movement of the rod 178 by the levers 166 is without effect upon the rod 170, to which the clutch-lever 162 is joined. If, however, the dies have been correctly supplied to the machine, the solenoid-circuit will be open, and the consequent descent of the plunger carries the pin away from the arm 190. The latter falls into engagement with the projection 188, and thus, upon movement of the secondary rod 178, the collar 182 is forced against the collar 169, shifting the rod 170 to cause the engagement of the clutch. The straightening of the toggle 184 locks the clutch in driving relation. When the solenoid is energized and causes the pin 204 to prevent clutch-engagement, a pin 206 upon the bar 194 breaks the toggle 184. Therefore, the completion of the energizing circuit, as by a switch 208 therein, serves to stop the operation of the machine after it has been started by one of the levers 166. Or the toggle may be broken to release the clutch by elevation of the bar through a hand-lever 209 fulcrumed upon the frame and pivotally connected to the bar. In either case, the spring 172 will cause the clutch P to open.

To reciprocate the carrier so that the sections 52 and 54 shall alternately occupy positions to co-operate, respectively, with the fabric-feeding mechanisms B and the pressure mechanisms D, and then with the pressure mechanisms D and the leather-feeding mechnisms C, and to give the proper dwell at each position for the various operations to be performed, it is actuated from the shaft 144. Upon the carrier A is a horizontal rack 210 (Figs. 6 and 7), with which meshes a pinion 212 secured to the upper end of a shaft 214 journaled vertically in the frame. Fixed to the lower end of the shaft is a gear 216 engaging a rack 218 arranged to slide in the frame at right angles to the rack 210. Pivoted to the rack 218 is a link 220 (Fig. 4) joined at its opposite extremity to a lever 222 (Fig. 2) fulcrumed upon the frame. The lever 222 has a roll entering a cam-groove 224 (Fig. 28) in that element of the gearing 161 which is upon the cam-shaft 144. The relation of the carrier transversely of the cooperating mechanisms B, C and D may be adjusted by altering the longitudinal relation between the rack 210 and the carrier. To accomplish this, the rack is releasably clamped upon the carrier by screws 223 (Figs. 7 and 10) passing through slots, and may be shifted, when these are freed, by nuts 227, 227 upon a screw 225 fixed in the rack and passing through an opening in a bracket secured to the carrier. The nuts may be turned against or separated from the bracket in effecting the adjustment.

The means whereby pieces of canvas are delivered to the opposite sides of the rib-forming die 56 is best shown in Figs. 5, 15, 16, 17 and 18. Since the two feeding mechanisms B are duplicates of each other, but one will be described. Each mechanism includes three portions, which act successively to produce feeding steps. First, a pair of rolls 230, 232 draws the canvas w in web form from a reel 234 (Fig. 2), and delivers it between a pair of measuring and positioning jaws 236, 238. The jaws continue the unreeling of the canvas-web which was initiated by the rolls until the desired length of canvas for the size of insole to be manufactured has been obtained, whereupon it is severed from the web by a knife 240 and co-operating block 241. Then the cut piece is moved forward between lower and upper pivoted leaves 242, 244, and, finally, these leaves lift and transfer the piece to the face of the plate 56 between the retaining jaws 94 and 96.

The bed-roll 232 of the delivering pair is mounted upon a horizontal shaft 246 journaled in the frame, to which shaft it is rotatably joined by one-way ratchet connections 248. Fast upon the shaft 246 is a gear 250 meshing with a horizontally movable rack 252 guided upon the frame. The rack is reciprocated, to oscillate the roll in it intermittent web-advancing action, by connections to the mechanism for actuating the jaws 236, 238, as will shortly appear. The shaft 254 of the upper roll is geared at 256 to its companion, and is rotatable in bearings movable vertically in the frame. Rods 258 rising from the bearings pass through openings in blocks pivoted upon a three-armed lever 260 mounted upon the top of the frame. Nuts 262 threaded upon the upper ends of the rods contact with the lever 260, limiting the downward movement of the rods as produced by springs 264 interposed between the tops of the roll-bearings and the blocks. These springs permit the upper roll to be yieldably pressed against the web. A link 266 (Fig. 5) unites the lever 260 to a pair of short levers 268 secured to a common fulcrum (Fig. 15), one of the levers 268 being joined by a rod 270 to a bell-crank lever 272 (Fig. 27) fulcrumed at the bottom of the frame. The lever 272 is connected by a link 274 to a second bell-crank lever 275, upon which is a roll engaging a cam-groove 276 in a disk 278 upon the shaft 144. These connections hold the upper roll 230 down while this and its companion 232 are rotating, so the web is fed forward by them to the jaws 236 and 238, and then lift the upper roll to permit the jaws to act.

The jaw 238 is integral with or secured to a slide 280 movable horizontally in ways 282 upon the frame (Fig. 15). The jaw 236 is pivoted upon the slide to oscillate into and out of work-grasping relation with the associated jaw. A link 284 joins the slide 280 to a lever 286 having a floating fulcrum upon a link 288 pivoted upon the frame. The position of the fulcrum is determined by a link 290 uniting it to a segmental lever 292 turning about a fulcrum 294 (Fig. 5). The point of connection of the link 290 and segment, and thus the effect upon the fulcrum of the lever 286, may be varied through a connecting block 296 slidable upon the segment and to which the link is pivoted, the block having a spring-actuated pin 298 arranged to engage any one of a series of openings 300 in the segment. These openings correspond to insole-sizes, the largest being horizontally alined with the fulcrum 294 of the lever. The lever 286 is oscillated to reciprocate the slide 284 and the jaws 236 and 238 by a chain of connections including a link 302, a bell-crank lever 304, a vertical rod 306, and a lever 308 (Fig. 27), the latter being provided with a roll entering a cam-groove 310 in the disk 278. A pin 312, projecting from the side of the lever 286, enters a slot in a link 314 articulated to the rack 252 of the rolls 230, 232. During the travel of the slide 280 to the right (Fig. 15), the pin 312 strikes the end of the slot and imparts to the rack 252 a corresponding movement. This rotates the rolls 230, 232 to feed forward the web until its end is between the jaws. Upon the opposite movement of the lever 286, the gear 250 is turned in the opposite direction; but this is idle, the ratchet-connections 248 not engaging. The effect produced upon the jaws 236, 238 by this oscillation of the lever 286 under the influence of the groove 310 is that of drawing off the maximum length of canvas to be used and advancing its forward end through an unvarying distance. The size-lever 292 is oscillated by a link 316 and lever 318, the last-mentioned lever having a roll operating in a cam-groove 320 upon the periphery of the disk 278. These connections, acting coincidentally with the drawing off of the web of canvas by the connections controlled by the cam-groove 310, hold back the jaws during their initial measuring travel to an extent determined by the setting of the pin 298, thus compensating for the difference between the maximum size and the particular size which is being produced. That is, if the pin 298 were in the lowest opening of the segment, the connections to the cam-groove 310 would cause the maximum length of the web to be drawn from the reel, the measuring lever 286 acting alone. For any other setting of the pin, the fulcrum of the lever 286 would be carried back or to the right (Fig. 15), under the influence of the now effective size-lever 292, by a predetermined amount, so that a less length of the material would be advanced. At the termination of this measuring movement, there is a dwell, produced by the contour of the cam-grooves 310 and 320, during which the measured length is cut from the web by the knife 240. Then the jaws continue in their full feeding movement until the cut piece is properly delivered upon the transferring leaf 242, the heel-ends of all sizes being at the same point.

The knife 240 is fixed transversely of the frame between the delivering rolls and the positioning jaws, and has beneath it the vertically reciprocating abutment-block 241. To this block is pivoted a link 322, which, at its lower extremity, is joined to a bell-crank lever 324. This in turn, is connected by a link 326 to a bell-crank lever 328, and from the latter a depending rod 330 extends to a bell-crank lever 332 (Fig. 27). A roll of the lever 332 enters a groove 334 in the disk 278. During the dwell of the jaws 236, 238, previously mentioned, the block is raised by its connections to the groove 334, forcing the web against the knife 240 and thus severing the length which has been measured by the jaws. The block then is depressed for the succeeding advance of the web to present the next fabric piece. Mounted adjacent to the knife 240 are one or more members 335 arranged to engage the web $w$ as the piece $b$ is cut from its end. Each member is preferably in the form of a spring-loop, with its free end extending normally below the cutting edge of the knife. During the elevation of the block, the web thereon strikes the free extremities of the loops, which yield, and when the block is again lowered, the members 335 follow it, holding the otherwise unrestrained end of the web against rearward movement until the roll 230 has descended and clamped said web against the bed-roll 232. At the same time, the members strip the fabric from the knife.

To open and close the jaws, the upper 236 has an upwardly extending arm connected to the slide 280 by a toggle-lever 340. Projecting laterally from one of the links of this lever is a pin 342 (Fig. 18), which enters a horizontal slot in an actuating slide 344 guided for vertical movement in the jaw-slide. The lower portion of the actuating slide travels in ways 346 in a bar 348 (Fig. 15) carried at one end upon one of the levers 268 and at the other upon a lever 350. The levers 268 and 350 are tied together by a link 352. As a result of this arrangement, the jaws are operated from the cam-groove 276, which governs the spacing of the rolls 230, 232. When the connections lower the upper roll for the feed of the fabric, the jaw 236 is separated from the companion jaw, so that they are ready to receive the advancing end. When the upper roll is raised to allow the jaws to perform the measuring operation, the connections to the jaw 236 close it to grasp the advanced end of the web of fabric. The rolls and jaws thus act alternately.

As the jaws 236, 238 advance the severed piece, the associated transferring leaf 242 is found in a horizontal position ready to receive it (Fig. 18). This leaf is secured to a spindle 360 arranged to turn horizontally in the frame adjacent to the lower portion of the carrier A. At the lower edge of the leaf 244, adjacent to the carrier, is a segment 362, against which the lower edge of the fabric piece may rest during its transferring movement. This leaf 246 is urged toward its companion by a torsion-spring 364 surrounding the spindle, but is normally maintained spaced from it by contact at 366 with the frame. The leaves are prevented from pinching the transferred piece between them, and thus interfering with its removal, by stop-blocks 367 fixed to the lower leaf. The leaf 242 is raised with the piece $b$ upon it by connections to an arm 368 projecting from the spindle, and which include a vertical link 370, a bell-crank lever 372 (Fig. 5), a link 376, and a lever 378, from which a roll projects into a cam-groove 380 in the disk 278. Gear-segments 374 join the levers 372 belonging to opposite sides of the machine, so beyond them the connections are not duplicated. With the piece upon it, the leaf 242 is raised until it engages the waiting leaf 244. This then swings with it, the piece being held loosely between the two and projecting outside their upper edges, until, when a vertical position is attained, the free edge of the piece is opposite the jaw 94, ready to be grasped between it and the jaw 96.

To outline the general fabric-feeding operation, and taking a time in the cycle when the carrier-plate 56 is in co-operation with the mechanisms B, the rolls 230, 232 are together, holding the web of fabric between them, the cutting block 241 is depressed, the jaws 236, 238 are traveling back toward the rolls and are separated, and the leaves 242, 246 are lowered, the former being substantially horizontal and alined with the jaws. As the jaws approach the termination of their outward travel, the rolls are rotated, and the end of the web carried thereby between the jaws. These close and the rolls separate (Fig. 16). The web being thus free to be moved by them, the jaws travel from the rolls, drawing from the reel 234 the desired length for the size which is to be manufactured by the combined effect of the maximum measuring and the compensating mechanisms. The measuring having been effected, the jaws pause in their movement, and the block 241 rises, so the measured piece b is cut from the web by the knife 240 (Fig. 17), the springs 335 holding the end of the web until the roll 230 again closes upon it. Thereupon, the jaws continue their movement to lay the cut piece with its heel-end at a predetermined point upon the leaf 242, which rises with the leaf 244, and finally delivers the piece to the jaws 94, 96. The fabric pieces for all lengths of insoles are thus correctly located with respect to the dies which are to operate upon them.

The leather- or body-feeding mechanisms C are most completely illustrated in Figs. 19 to 23, inclusive. Again considering but one of the two like organizations, upon the main frame F is supported a skeleton frame 390 adapted to receive within it a box or magazine 392 containing a stack of the leather pieces c. Horizontal brackets 394 (Fig. 1), alined at their tops with the bottom or supporting surface of the frame 390, facilitate the introduction of the boxes. When a box is in place, spring-plungers 396, seated in the frame 390, force loose horizontal rails 397 against the bottom of said box, holding its top against a horizontal surface at the upper portion of the frame. The uppermost piece in the contained stack is thus approximately positioned vertically with respect to the device which is to transfer it to the operating mechanism. A spring-finger 398 (Fig. 21), secured to the frame, has a rounded end 400 bearing on the upper edge of the box when this is in place. This finger serves, by its pressure, to maintain the box at one side of the frame in a predetermined relation to the plate 76 of the carrier to which the contained pieces are to be transferred. At the bottom of the frame 390 is pivoted a hooked retaining member 402, held up by a spring 404 into the path of the box as this is moved in over the brackets 394, and positively retaining said box against entering or leaving the frame 390 until the member has been lowered. This occurs only at a time when the associated elements are in the proper cooperative relation, as will later be more fully brought out. The bottom of each box has a contracted opening smaller than the pieces, through which opening may rise a platform 406, which elevates the contained stack in successive steps to present the top piece for transfer to the plate 76. The platform is attached to the upper end of a vertical rod 408, the lower end of which has a horizontal arm 410 projecting beneath the bottom of the magazine from a carrier-slide 412. This slide is guided for vertical travel by rods 414, 414 fixed in the frame 390. I prefer to counterbalance the platform independently to compensate for its weight with its connections, this being constant, and for the varying weight furnished by the gradually changing stacks of pieces c. The first is provided by a weight 416 hanging upon a cord 418 attached at 420 to the frame and at 422 to the slide, being guided by a sheave 424. The variable counterbalance is applied to the mechanism for actuating the platform, and will be described in connection therewith. Attached to the slide 412 is a handle 426, by which it may be lowered to its initial position after the delivery of a stack from a magazine-box has been completed. Prior to the application of a full box, the platform may be held in its receiving relation by a latch 428 pivoted upon it and engaging a projection 430 from the frame (Fig. 20). A spring 432 draws the latch toward the projection, while an arm 434, convenient for grasping by the operator, allows the platform to be released from the latch for its elevation. When the platform is lowered by the handle 426, as it reaches the position in which it is to be latched to receive a filled magazine-box, a roll 436 upon it contacts with an inclined surface 438 on the box-retaining member 402. This lowers the hooked end of the member, leaving the way free to remove an empty box and to introduce one which is full over the brackets 394. Thus, until the platform has arrived at the proper level, the boxes cannot be shifted.

To elevate the platform with the stack of pieces, c, there is secured to its slide, at 440, a cord 442, which passes over a guide-sheave 444 rotatable upon the main frame (Fig. 22), and then partly about and is fastened to a sheave 446 turning about a fixed spindle 448. Surrounding a hub of the sheave 446 is a ratchet-wheel 450 (Figs 22 and 23) forced into frictional engagement with the adjacent face of the sheave by the arms of a spring-spider 452, the center of which is adjustably held by a sleeve 454 threaded into the frame and surrounding the spindle 448. By varying the position of this sleeve, the force which the spider 452 exerts upon the ratchet-wheel may be varied. A bell-crank lever 456 (Fig. 29), fulcrumed at 458, has fast upon its fulcrum-spindle a disk 460 (Fig. 22), from which, eccentric to the axis, projects a pin 461 carrying a pawl 462 engaging the teeth of the ratchet-wheel 450. A roll upon the lever 456 lies in a cam-groove 464 in the disk 142. A link 466 ties the lever 456 to a like lever with a disk and pawl-actuating pin at the opposite side of the machine. The oscillation of the pawl 462 by the pin 461 feeds the ratchet-wheel forward step by step, and thus, through the sheave 446 and cord 442, gradually elevates the platform 406, thus presenting the pieces c one by one for transfer to the plate 76. To insure proper engagement with the pieces by the transferring device, the amount which the platform is raised at each step of the ratchet is made more than is necessary, the frictional connections between the sheave 446 and the ratchet-wheel 450 permitting the former to slip and the stack and platform to be lowered somewhat by the piece-engaging pressure of the transferring device. Double detents 468, 468, having their points engaging the ratchet-teeth and being separated circumferentially of the wheel by less than the pitch of a tooth, hold said wheel against reverse rotation, and insure its retention with little backlash. With each sheave 446 is preferably associated counterbalancing mechanism, previously referred to, which varies in its effect with the gradual decrease in the stack of pieces c upon the platform 406. This sheave is joined by gearing 470 (Fig. 23) to a shaft 472 carrying a sheave 474. To the periphery of the sheave 474 is attached a cord 476, the other extremity of which is secured to the lower portion of a segment 478 (Fig. 24) formed upon a lever 480 turning upon the main frame. A weight 482 is adjustably fastened to the lever. The connections between the weighted lever and the sheave 474 are such that, when the platform 406 is at its highest point and there are consequently no pieces c upon it, the weight hangs in a vertical line through the fulcrum of the lever, and no counterbalancing pull is exerted through the cord 476. When the platform is lowered and has a full box upon it, the lever is turned by the pull of the cord until the weight 482 is raised to exert its maximum counterbalancing effect, this being equal to the entire stack of pieces. As the pieces are removed and the platform rises, the weight correspondingly falls, and the leverage through which it acts upon the cord correspondingly diminishes, so the counterbalancing effect is maintained substantially proportional to the weight of the stack.

As the pieces c are successively brought to the top of the magazine-box, they may be trued, both longitudinally and laterally, in a horizontal plane to prepare them for accurate presentation to the plate 76. Arranged for contact with the sides of the heel-portion of the upper piece in the stack is a pair of levers 490, 492 (Fig. 21) fulcrumed at the top of the magazine-frame 390 to swing horizontally. The adjacent arms of these levers are geared together at 494, and their blank-engaging extremities are drawn toward each other by a spring 496. Associated with the opposite sides of the toe-portion is a similar pair of levers 498, 500 connected to move together under the influence of a spring, like the companion pair. Contacting with the heel-end of the upper piece c, between the levers 490, 492, is a lever 502, and with the toe-end, a lever 504. These act in directions parallel to the longitudinal axis of the piece, while the side arms act transversely. Lever 502 is caused to retreat from the stack by contact with a projection 506 upon it of a projection 507 on the lever 492, and the levers 502 and 504 are joined by a link 508, one extremity of which is slotted to give some lost motion in the connections. A spring 510 exerts its force through the link 508 to cause the approach of the contact-ends of the levers 502 and 504. Journaled horizontally at the top of the frame 390 is a shaft 512 having secured to it arms 514 and 516. Through openings in these arms pass rods 518 and 520, pivoted respectively to the heel- and toe-levers 490 and 498. Nuts 522 on the rods are engaged by the arms as the latter swing outwardly, and in so doing move the pairs of levers 490, 492 and 498, 500 away from the stack against the tension of their springs.

At the same time, the connections 506 and 508 separate the levers 502 and 504. This movement of the arms is effected by rocking the shaft 512 through engagement with an arm 524 fixed upon it of a contact-portion 526 carried by one of the elements of the actuating means for a pressure mechanism D. As the pressure mechanism assumes its outward, inactive position, the contact member 526 turns the shaft 512 and causes the arms 514 and 516 to engage the nuts 522 to respectively withdraw the pairs of levers from the sides of the stack, the movement of the lever 492 also causing the withdrawal of the levers 502 and 504. At this time, the elevation of the stack may occur. Then, as the pressure mechanism acts, the arms are moved away from the nuts by a torsion-spring 527 encircling the shaft 512, leaving the springs 496 and 510 free to produce the truing engagement of the arms. The linkage between the levers is so proportioned that this inward movement is continued for the contact-end of each lever until it reaches the correct locating point for the smallest piece c to be operated upon. For larger pieces, the levers are stopped by their engagement with the stack, the proper relative positions of their engaging ends being maintained for all sizes.

Figure 4:
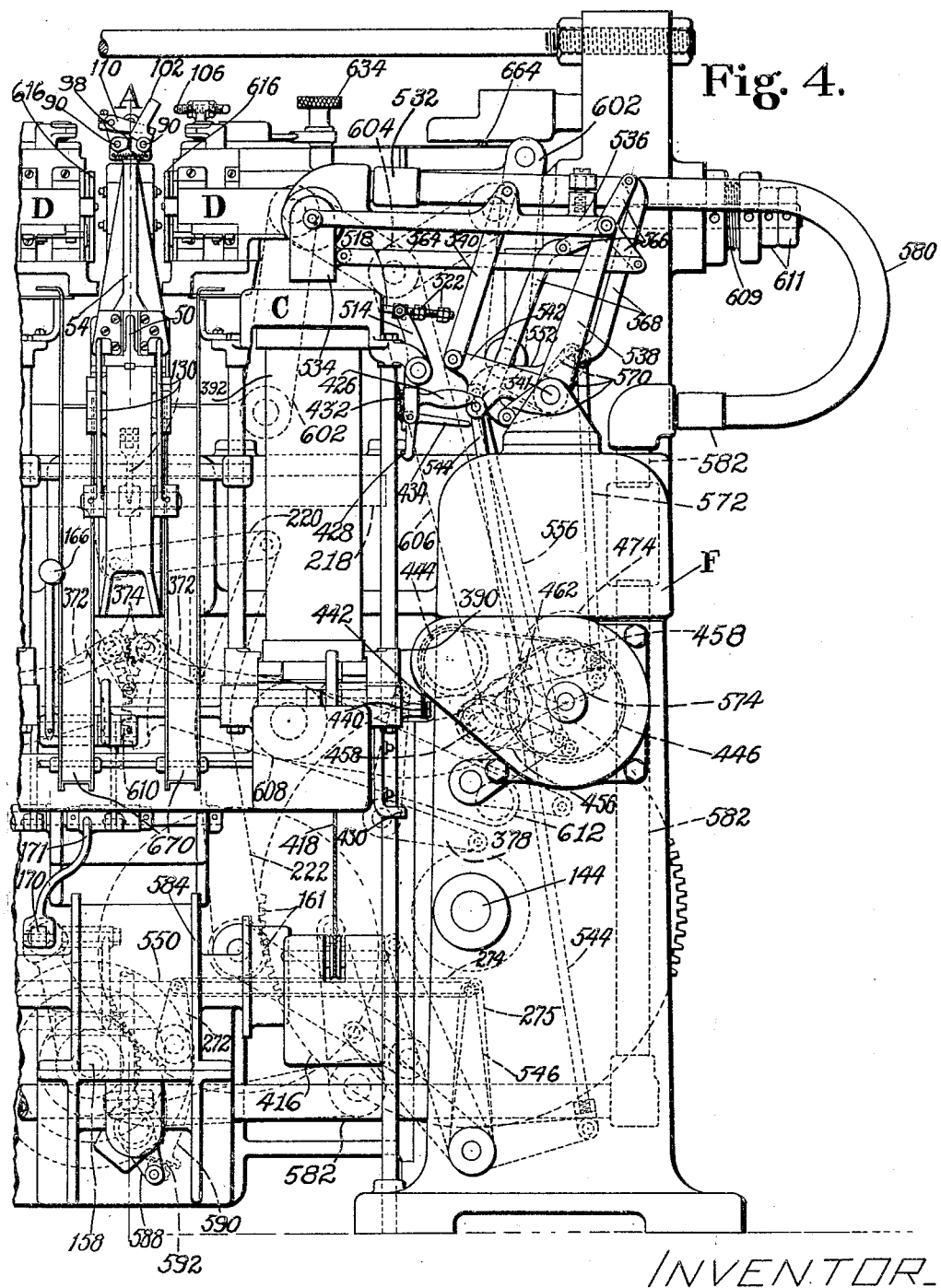
Figure 26:
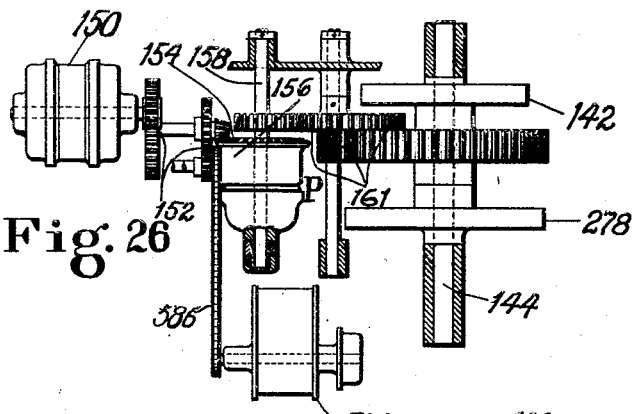
Fig. 26 is a plan, on a reduced scale, of the driving mechanism.

The upper piece c in each stack having been thus raised to the proper level in the magazine by the platform 406 and acted upon by the positioning levers 490, 492, 498, 500, 502 and 504, it is ready for transfer to the assembling plate 76 of the carrier. As shown most clearly in Figs. 1 and 4, there is situated above each magazine for the pieces c a movable suction-pipe or conduit 532, having pivoted upon its inner end a terminal head 534, in which is an opening arranged to engage and retain temporarily the work-pieces for delivery from the magazine to the plate. The pipe is carried upon a cradle 536, which is mounted to oscillate upon the upper extremities of arms 538 and 540. The arm 538 is pivoted about a spindle 541 on the frame F, while 540 turns upon a lever 542 rotatable about the spindle 541. A link 544 extends between the lever 542 and a lever 546 (Fig. 29), the latter being provided with a roll operating in a cam-groove 548 in the disk 142. By the movement of the conduit under the influence of the cam-groove 548, the head 534 is lowered into contact with the upper piece c in the stack, and then raised, carrying said piece with it in preparation for its delivery to the plate. Connections 550 (Figs. 3 and 4) communicate this movement of the lever 546 to the opposite transferring device. Projecting from the supporting arm 538 of the cradle is an arm 552 united by a link 556 to a lever 558, upon which is a roll entering a cam-groove 560 in the disk 142. Through these connections, the last-mentioned cam-groove reciprocates the conduit in a substantially horizontal direction, so that the head 534 travels from a point above the stack to one in which the opening in the head is in proximity to the face of the plate 76, the head having been turned upon the conduit by the means which will now be described. Connections 562 (Figs. 3 and 29) lead to the associated transferring device, so that this simultaneously receives the horizontal movement. The suction-head is oscillated on the conduit between a substantially vertical position, in which it is carried into contact with the piece c upon the stack, to a horizontal position, in which its opening is toward the plate. This may be effected through a link 564 joining the head to a three-armed lever 566 fulcrumed upon the cradle 536, the chain of elements being continued by parallel links 568, 568, a lever 570 the three arms of which are fixed to the spindle 541, a link 572 and an arm 574 fixed to the fulcrum-spindle 458 oscillated from the cam-groove 464, which also actuates the ratchet mechanism for the platform 406. The operating cycle of the suction device includes the lowering of the opening of the head 534 into engagement with the top piece upon the stack, raising the head and turning it upwardly to a horizontal position, and carrying the piece held upon the opening by the suction into contact with the face of the plate 76, and a return by similar steps to its normal position. The outer extremity of each pipe 532 is joined by a flexible hose 580 to a pipe 582 leading to the casing of a rotary suction-fan 584 (Fig. 4). This fan may be driven by belting 586 from the gearing 152 (Fig. 26). The suction through the conduit and head may be governed by a perforated valve 588 (Fig. 27), swinging between spaced sections of the pipe 582 and in one position causing the suction through its perforation to act, and in the opposite position opening the ends of both sections to the outer air and rendering the suction ineffective. In the first instance, the force of the suction is exerted at the time the opening in the head is in proximity to the top of the stack to hold the terminal piece against the head, and in the second, the transferred piece is freed, to be retained upon the plate 76 by the fingers 122. The valve 588 is shown as actuated from the lever 272, which raises and lowers the upper web-advancing roll 230 under the influence of the cam-groove 276. The connections between the lever and the spindle upon which the valve is mounted are furnished by an arm 590 of the lever and intermeshing gear-segments 592.

One of the duplicate pressure mechanisms D will now be described with particular reference to Figs. 3, 4, 13 and 14. A reciprocatory ram 600 is alined horizontally with one side of the rib-forming die-plate 56 and the assembling plate 76 of the carrier. The ram is mounted upon the upper ends of rocker-arms 602, 602 pivoted upon the frame. The inner arms of the ram are joined to a toggle-lever 604, the center of which is united by a link 606 to a lever 608 fulcrumed in the lower portion of the frame. The outer extremity of the toggle-lever is pivoted upon a slide 605 arranged to reciprocate horizontally in the frame. The slide is held normally in by a spring 607 surrounding a reduced portion and abutting against a sleeve 609 threaded into the frame. Outward movement of the slide against the spring allows a yielding pressure to be applied by the ram to the work, the resistance being variable by change in the location of the sleeve. The normal position of the pivotal connection of the toggle-lever 604, and therefore the extent of approach of the ram to the carrier, may be determined by nuts 611 threaded on the reduced portion of the slide and contacting with the sleeve. Gear-segments 610 connect to each other the levers 608 of the opposite pressure mechanisms, and one of said levers has an arm 612, upon which is a roll entering a cam-groove 614 in the gear 161 which is on the cam-shaft 144 (Fig. 28). By these connections, the rams are moved in and out, carrying them from their normal positions to bring the die-plates which they bear at their inner ends into co-operation with either the rib-forming die-plate 56 or the assembling plate 76, according to which of these is presented by the carrier. There is a dwell in this movement at both the retracted and advanced positions, the first to permit the carrier-shifting and material-feeding operations to be performed, and the second to cause the continued pressure to properly mold the rib a in the canvas piece b and to join the thus-molded piece to the leather piece c. The ram is shown as having at its lower inner portion a projection 613 (Fig. 13) adapted to enter either of two recesses 615 (Figs. 6 and 10) in the carrier. The projection fits these depressions, as far as its horizontal dimension is concerned, so the carrier is retained against displacement along its ways during the application of pressure in both the rib-molding and piece-assembling operations. Against a vertical abutment-surface at the inner end of the ram, a die 616 is held, having in its face a depression 617 (Fig. 7) corresponding in form to the projection 58 in that die 56 which is in place in the carrier, the depression and projection co-operating when the carrier brings its section 52 to the rib-forming position. The die may be locked in place by opposite hooked retaining members 618, which are arranged to enter recesses in its sides. These members, like the latch 60 of the carrier-die, may be off the vertical centers of the abutment-surface, and are guided to move rearwardly into their locking relation, or oppositely to release the die, by pins 620 (Fig. 14) projecting from the ram and entering oppositely inclined slots in said members. Movement is imparted to the members through bell-crank levers 622 fulcrumed upon the ram, links 624, a toggle-lever 626, an eccentric-rod 628 connected to the middle of the toggle, and an eccentric 630 fast upon a vertical spindle 632 carrying at its upper extremity a hand-wheel 634. When the hand-wheel is turned to break the toggle, the hooks of the members 618 are withdrawn from the recesses, so that a die may be introduced and another substituted, and upon straightening the toggle, the hooked ends are caused to enter the recesses, both locking the die against upward displacement and, because of the co-operation between the pins 620 and the inclined slots, also drawing it firmly back against the abutting face of the ram. Spring-actuated plungers 635, movable in the ram and bearing against the links of the toggle, act to normally maintain this locking relation. Operating through two openings in the heel-portion of each die 616 are punches 636 yieldable against springs 638. These punches are beyond the end of the rib-molding plate 56, and are spaced from one another along the longitudinal axis of the insole at its rear extremity. Each may operate against an inserted piece 639 of relatively soft material in the plate 76 (Fig. 10).

In connection with the dies 56, reference has been made to the depression 71 in them and to the electrical contacts 75 actuated thereby. These co-operate in the control of the solenoid 200 (Fig. 25), by way of the conductors 202, with contacts 640 (Fig. 13), the latter being closed by levers 642 pivoted upon the ram and forced down by the edge of the inserted die 616, or allowed to separate if the upper ends of the levers enter depressions 644 in the die. In Fig. 25 appear diagrammatically two sets of contacts 640 belonging to the opposite rams, and a single set of contacts 75 for the carrier, there being five in each set. One of the conductors 646, through which current is supplied, is joined to all the fixed contacts of the two sets 640 in parallel, while the other supply-conductor is similarly connected to all the fixed contacts of the set 75. Corresponding movable contacts in the sets are joined to one another. The connections 641 from the multipled fixed contacts 640 to the circuit are brought out from the reciprocating rams through fixed and sliding contacts 643 (Fig. 14). The conductors 202 include the solenoid in series with one side of the line. In absence of dies in the ram and carrier, all the contacts 640 are open, and all the contacts 75 are closed. Under these conditions, nowhere is there a path completed between the supply-conductors, the solenoid is de-energized, the arm 190 (Fig. 25) is allowed to engage the sleeve-projection 188, and movement of a lever 166 will cause the engagement of the clutch P and start the machine. As there are no dies in place, no harm can result from improper contact. The depressions 71 and 644 in the carrier-dies and ram-dies are so arranged with reference to the plungers 73 and levers 642 that, if the co-operating dies are correctly matched, with the rib 58 of one registering with the depression 617 of the other, some one or more of the series of contacts which are connected to one another will be selected and reversed, the two ram-contacts 640 will be allowed to open, while the carrier-contact 75 is closed. Therefore, the connections between the sides of the supply-conductors will remain broken, the solenoid will be de-energized, and the machine may be started as just indicated. In the circuit-diagram shown in connection with Fig. 25, correctly matched rib-molding dies have been placed in the carrier and ram, which have the depressions 71 and 644 corresponding to the first, third and fifth transverse or horizontal series $l$, $n$ and $o$, respectively, of the movable contacts in the vertical sets. If the operator had, for example, placed in the carrier a die of another size provided with two depressions co-operating with the first and second series of contacts $l$ and $m$, the contact 75 of the series $m$ would be permitted to close. This, with the normally closed contacts 640 in the ram in series $m$, would complete the circuit of the solenoid, energizing this to remove the arm 190 from the projection 188. Actuation of the lever 166 would consequently not start the apparatus, and breakage of the dies would be prevented.

The sewing-rib $a$ may be more permanently set in the desired form if heat is applied to it during the molding operation. For this purpose, I have shown the ram-dies as each under the influence of electric heating units 660 (Fig. 14), of which four may be employed inserted in the body of the ram adjacent to the die. The units are joined in parallel by conductors 662 to the supply-conductors 646. These connections may be by way of sliding and fixed contacts 664. To avoid overheating, with possible burning of the material, I have shown a thermostatic element 666 mounted at one end upon the ram near the units. This element will so expand, if the temperature of the head of the ram is unduly raised by the units, as to open that portion 668 of the circuit leading from the supply-conductors to the points at which the units are multipled. When the temperature of the ram and die falls to a safe degree, the element 666, by its contraction, again closes the heating circuit.

After a pair of insoles has been completed by the pressure against the leather pieces c, held upon the assembling plate 76 of the carrier A, of the molded fabric pieces b retained on the ram-dies 616, they are discharged into a chute 670 (Fig. 1) for removal from the apparatus. To free the insole-rib a from its die-depression 617, ejecting means has been arranged upon each ram. Movable horizontally at the inner end of the ram and through an alined opening in the die 616 is a plunger 672 (Fig. 13), held normally back, so that its operating end is within the die, by a spring 674. Beneath the ram, a bar or connecting member 676, contacting with the outer extremity of the plunger, is mounted to slide longitudinally on a guide-rod 678, and may also oscillate about this rod in a vertical plane. A second guide-rod 680 supports the outer end of the bar, which has a cam-surface 682 resting upon it. A spring-actuated plunger 684 urges the cam-surface yieldably into engagement with the rod 680. Journaled upon the frame, beneath the ram, is a shaft 686 common to the ejecting means for both sides of the machine, at each outer end of which is a substantially horizontal arm 688 and near the center a substantially vertical arm 690. A rod or actuating member 692, guided at 694, is pivoted to the arm 688 and extends to a point just beneath the bar 676, being held normally in this position by a spring 696 surrounding the shaft 686. At the same time, the arm 690 is maintained yieldably in the path of a roll 698 (Fig. 6) mounted at the lower portion and near the longitudinal center of the carrier A. When the carrier is so located that the rib-forming die 56 is alined with the rams, the ejecting plunger 672 will remain in its retracted position. At this time, the roll 698 is out of contact with the arm 690, and the rod 692 is lowered by its spring. When the carrier is shifted to bring the assembling plate 76 between the rams, the roll 698 strikes the arm 690 and causes the rod 692 to be lifted against the under side of the bar 676 raising this against the pressure of the plunger 684. The bar, in the advance of the ram, slides over the end of the rod until its outer extremity is clear of said rod. It is then pressed down to its normal position by the plunger 684. When the ram is moved back after the assembling operation, its die carrying a completed insole upon its face, the contact of the end of the bar with the side of the rod causes the former to thrust out the plunger and force the rib a of the insole out of the die-depression 617, so that it falls into the chute 670. In this rearward movement, the surface 682 gradually cams the end of the bar above the rod, so that, by the time the outward travel of the ram is completed, the bar is freed from the rod 692, and the latter resumes its normal position.

Now outlining the general operation of the machine, it will be assumed that reels 234 of the webs of coated fabric w are in place, and that magazine-boxes 392 of the leather pieces c have ben moved in upon the lowered platforms 406. There is thus provided the material for the production of both a right and a left insole at one operation. Considering, as the initial relation, that the carrier A is at the right, as viewed in Figs. 1 and 2 of the drawings, this positioning the rib-forming section 52 in co-operation with the canvas-feeding mechanisms B, B, while the section 54 is alined with the pressure mechanisms D, D, a cycle will be traced beginning with the delivery to the carrier of the canvas pieces b. The actions at this time occurring in connection with the section 54, and performed upon a preceding sole, will be disregarded. With the carrier in the relation just indicated, the rolls 230, 232 have advanced the ends of the webs w of fabric between the open jaws 236, 238, and have separated, allowing these jaws to draw off measured amounts of the material corresponding in length to the size of the insoles to be made and determined by the setting of the pins 298. The cutting blocks 241 have been elevated during a dwell of the jaws after the measuring operation was completed, and severed the fabric pieces b against the knives 240. After this, the jaws move further to lay the cut pieces upon the leaves 242, the rolls 230 descend to clamp the ends of the webs, and the blocks 241 fall to their normal position. With the cut pieces upon them, the leaves 242 rise, and, with the assistance of the companion leaves 244, transfer the upper edges of the pieces between the jaws 94, 96 located at the top of the carrier-section 52 and latched open at this time to receive the pieces. These jaws are permitted to be closed by their springs as a result of contact of the projection 106 with the latch in the preceding assembling operation of the rams 600 of pressure mechanisms D, D, this occurring concurrently with the feeding of the fabric. With the received pieces b held between the jaws 94 and 96, the carrier travels to the left (Figs. 1 and 2), while the feeding rolls, measuring jaws, transferring leaves and the cutting mechanism prepare for the delivery of other pieces of canvas. The carrier having completed its movement, with the section 52 in registration with the pressure mechanisms, the rams are advanced toward the carrier, so that the die-depressions 617, in co-operation with the projections 58, form sewing-ribs *a* in the canvas pieces, heat generated by the electric units 660, controlled by the thermostat 666, assisting in rendering these ribs more rigid. In this position of the carrier, the delivery of fresh pieces *b* of canvas toward the leaves 242 is going on as already outlined, and the suction-heads 534, which have descended upon and seized leather pieces *c* from the top of the stacks in the magazines, are advancing to place these upon the surfaces of the dies 76, where the fingers 122 close upon and retain them. After their rib-forming dwell, the rams retreat from the die-plate 56, carrying with them the formed pieces of canvas, retained by the engagement of their ribs with the die-depressions 617. The carrier starts back to the right while the rams are moving outwardly, and now the succeeding pieces of canvas are being placed upon the leaves 242 by the measuring jaws 236, 238. The suction-heads 534 are returning to the magazines for leather pieces for the next pair of insoles. Attaining its right-hand position, the carrier again presents the section 52, from which the ram-dies have removed the canvas, to the feeding mechanisms B, B, and its assembling section 54, bearing the just-supplied leather pieces *c*, to the pressure mechanisms D, D. The rams of the latter, carrying the molded canvas pieces, are advanced to force the latex-coated surfaces of said pieces against the leather pieces *c*. The pressure between the opposed ram and carrier members, aided by the heat applied by the electric units, produces firm adhesion of the pieces, completing the formation of the pair of insoles. When the rams are withdrawn from this assembling operation, the ejecting plungers 672, which were inactive during the rib-forming operation, are projected from these rams to force the ribs *a* from the die-depressions 617, causing the completed work to be delivered to the chute 670. During the completion of the cycle by the assembling operations on carrier-section 54, a delivery of canvas pieces to the section 52 is completed for the succeeding pair of insoles, as already described. At the leather-feeding mechanisms C, C, the suction-heads 534 are moving toward the stack to pick up the leather pieces for this succeeding pair.

Having described my invention, what I claim as new and desire to secure by Letters Patent of the United States is:

1. In an insole-making machine, pressure mechanism, a reciprocatory carrier, and a rib-molding die and an assembling plate separably mounted upon the carrier and movable thereby into alternate co-operation with the pressure mechanism.

2. In an insole-making machine, pressure mechanism, a reciprocatory carrier provided with pairs of vertical ways, plates separably mounted in the ways and movable by the carrier into alternate co-operation with the pressure mechanism, and retaining members for the plates associated with their opposite ends.

3. In a shoe machine, the combination with pressure mechanism including opposite ways and a die-plate separably mounted in said ways, of a plurality of retaining members for the plate projecting into the ways, and a single releasing device acting upon the retaining members.

4. In a shoe machine, the combination with pressure mechanism including opposite vertical ways and a separable die-plate supported by the ways, of latches for engagement with the opposite ends of the plate between the extremities of the ways, a rotatable spindle, and connections between the spindle and both latches.

5. In a shoe machine, the combination with pressure mechanism, of a carrier, a plate separably mounted upon the carrier and co-operating with the pressure mechanism, a latch co-operating with the plate, a spring arranged to force the latch toward the plate, a member contacting with the latch, and a spindle having an eccentric portion arranged to move the member and latch against the force of the spring.

6. In a shoe machine, the combination with pressure mechanism, of a carrier, a plate separably mounted upon the carrier and co-operating with the pressure mechanism, latches at the ends of the plate, said latches having opposite arms, a spring arranged to act upon an arm of each latch and force it toward the plate, a member contacting with the associated arm of each latch, and a rotatable spindle having an eccentric portion contacting with each member.

7. In an insole-making machine, molding means comprising a die having at each of its opposite sides work-engaging surfaces and ways to receive said die, and a latch having a projection movable into the ways at a point removed from the longitudinal center of said ways, the die being provided with a correspondingly located recess to receive the projection in one position only.

8. In a shoe machine, the combination with a pressure member, of a die mounted upon the pressure member, retaining members movable upon the pressure member and arranged to engage and draw the die against the pressure member, and fixed guides co-operating with the members to produce such movement.

9. In a shoe machine, the combination with a pressure member, of a die mounted upon the pressure member, hooked retaining members mounted for bodily movement upon the pressure member, and means for moving the hooked portions of the retaining members in one direction into engagement with the die and for moving the members in another direction to draw said die toward the pressure member.

10. In a shoe machine, the combination with a reciprocatory ram, of a die carried by the ram, a retaining member movable at each side of the die, a toggle-lever carried by the ram, connections between the opposite extremities of the toggle-lever and the retaining members, and means for straightening and breaking the toggle-lever.

11. In a shoe machine, the combination with a reciprocatory ram, of a die carried by the ram, a retaining member movable at each side of the die, means for guiding the retaining member to move in an inclined direction with respect to the face of the ram, a toggle-lever carried by the ram, means for joining the opposite ends of the toggle-lever to the retaining members, an eccentric movable upon the ram, and an eccentric-rod connected to the center of the toggle-lever.

12. In a shoe machine, the combination with a reciprocatory ram, of a die carried by the ram, a retaining member movable at each side of the die, a toggle-lever carried by the ram, connections between the opposite extremities of the toggle-lever and the retaining members, means for straightening and breaking the toggle-lever, and means arranged to maintain the toggle-lever normally straight and the retaining members in engagement with the die.

13. In a shoe machine, the combination with a carrier, of a die mounted on the carrier and having a substantially vertical operating surface, a work-grasping member movable at one edge of said surface about an axis fixed with relation to the carrier, means for holding a work-piece in proximity to said surface, and means for moving the member into engagement with the work-piece.

14. In a shoe machine, the combination with a carrier having opposite substantially parallel operating surfaces, of a work-grasping member movable at one edge of each surface, means for simultaneously feeding work-pieces in proximity to the surfaces, and means for moving the members into engagement with the pieces.

15. In a shoe machine, the combination with a carrier, of a plate mounted thereon, and a pair of jaws mounted to turn about fixed axes upon the carrier adjacent to the plate and arranged to grasp the work by contact with the side adjacent to the plate and with the opposite side.

16. In a shoe machine, the combination with a carrier having opposite operating surfaces, of two members movable upon the carrier and each furnishing a jaw of pairs of work-grasping jaws situated at opposite sides of said carrier.

17. In a shoe machine, the combination with a carrier having an operating surface, of a pair of jaws mounted upon the carrier adjacent to the operating surface and arranged to grasp the work between them, means for normally separating the jaws, and a latch for holding the jaws in their grasping relation.

18. In a shoe machine, the combination with a movable carrier, of a plate mounted thereon, a pair of jaws mounted upon the carrier adjacent to the plate and arranged to grasp the work between them, means tending to separate the jaws in all positions to the carrier, and means for causing the jaws to yieldably grasp the work.

19. In a shoe machine, the combination with a carrier having a substantially vertical operating surface, of a work-grasping member pivoted at one edge of the surface, means for holding a work-piece in proximity to said surface, means for moving the member into engagement with the work-piece, and a lever having a yieldable portion acting upon the member.

20. In a shoe machine, the combination with a carrier having a substantially vertical operating surface, of a work-grasping member pivoted at one edge of the surface, means for holding a work-piece in proximity to said surface, means for moving the member into engagement with the work-piece, a lever having a yieldable portion acting upon the member, and a latch for the lever.

21. In a shoe machine, the combination with a carrier, of a die mounted on the carrier and movable to a plurality of operating positions, operating mechanism, a work-retaining member mounted upon the carrier, controlling means mounted upon the carrier and acting in one position of the carrier to cause the retaining member to engage the work and in another position of the carrier to cause the release of the work, and means movable by the operating mechanism for actuating the controlling means.

22. In an insole-making machine, a reciprocatory carrier having two operating sections, a pressure-ram co-operating with both sections, work-grasping jaws mounted upon a section of the carrier, and means carried by the ram and arranged to close the jaws in one position of the carrier and to cause them to open in another position.

23. In an insole-making machine, a reciprocatory carrier having two operating sections, a pressure-ram co-operating with both sections, work-grasping jaws mounted upon a section of the carrier, a lever having a yieldable portion acting upon the jaws, a latch for the lever, and a member carried by the ram and contacting with the lever and latch in different positions of the carrier.

24. In an insole-making machine, a carrier having a substantially vertical operating surface, fingers spaced from one another and pivoted at one edge of the operating surface, and means for turning the fingers to grasp the heel-portion of an insole.

25. In an insole-making machine, a carrier having a substantially vertical operating surface, fingers spaced from one another and pivoted at one edge of the operating surface, means for turning the fingers to grasp the heel-portion of an insole, and means for applying another insole-portion to that thus grasped over an area beyond the fingers.

26. In a shoe machine, the combination with a movable carrier having an operating surface, of a movable member arranged to hold an insole against said surface, connections upon the carrier through which the member is moved, an actuating member into co-operation with which the connections are moved by the carrier, and means operable by the machine for moving said member into contact with the connections to actuate the work-holding member.

27. In a shoe machine, the combination with a carrier-slide, of a plate mounted thereon, a spindle journaled in the slide, fingers secured to the spindle and extending along the plate, a pinion fixed to the spindle, a rack arranged to reciprocate longitudinally of the slide and meshing with the pinion, and means for moving the rack.

28. In a shoe machine, the combination with a movable carrier-slide, of a plate mounted thereon, a spindle journaled in the slide, fingers secured to the spindle and extending along the plate, a pinion fixed to the spindle, a rack arranged to reciprocate longitudinally of the slide and meshing with the pinion, and an actuating member into co-operation with which the rack is moved by the slide.

29. In a shoe machine, the combination with a movable carrier having an operating surface, of a movable work-grasping member arranged to hold an insole in co-operation with said surface, a latch for the member, a spring effective to draw the latch into retaining engagement, and a member into co-operation with which the carrier moves the latch, said member being arranged to withdraw the latch against the force of its spring.

30. In a shoe machine, the combination with a reciprocatory carrier having an operating surface, of a movable work-grasping member co-operating with the surface, a latch arranged to hold the member in its grasping relation, and a releasing member movable by the latch upon travel of the carrier in one direction and arranged to move the latch during the travel of the carrier in the opposite direction.

31. In a shoe machine, the combination with a movable carrier having an operating surface, of a movable work-grasping member arranged to hold an insole in co-operation with said surface, connections upon the carrier through which the member is moved, an actuating member into co-operation with which the connections are moved by the carrier, a latch for the work-grasping member, and a member into contact with which the carrier moves the latch.

32. In a shoe machine, the combination with a reciprocatory carrier having an operating surface, of a movable work-grasping member co-operating with the surface, a latch arranged to hold the member in its grasping relation, an actuating lever for the grasping member, and a switch-cam co-operating with the latch, the lever and cam being situated near one extreme of movement of the carrier.

33. In a shoe machine, operating mechanism including interchangeable elements constructed and arranged for engagement with the shoe-portions operated upon, driving mechanism for the machine, and means for controlling the driving mechanism, said controlling means being effective only when elements applied to the operating mechanism are correctly chosen with respect to each other.

34. In an insole-making machine, molding mechanism including interchangeable complemental dies, driving mechanism for the machine, and means for controlling the driving mechanism, said controlling means being effective to connect the driving mechanism only when the dies applied to the molding mechanism are correctly matched.

35. In an insole-making machine, operating mechanism, driving mechanism therefor, controlling means for the driving mechanism, operator-governed connections for the controlling means arranged to render the driving means effective only upon continued actuation by the operator, operator-governed connections arranged to lock the controlling means for operation of the machine independently of the operator, and means for governing the controlling means under the influence of the operating mechanism.

36. In an insole-making machine, operating mechanism, driving mechanism therefor, controlling means for the driving mechanism, operator-governed connections for the controlling means arranged to render the driving means effective only upon continued actuation by the operator, operator-governed connections acting upon the first-mentioned connections and arranged to lock them and produce continuous operation of the machine, and means acting upon the connections and governed by the operating mechanism.

37. In a shoe machine, the combination with operating mechanism, of driving mechanism including a clutch, means for maintaining the clutch normally disconnected, an operator's lever and connections thereto arranged to engage the clutch against the action of the disconnecting means, an operator's lever and connections thereto arranged to lock the first-mentioned connections with the clutch engaged, and means arranged to release the locking connections and being governed by the operating mechanism.

38. In an insole-making machine, operating mechanism including one of a set of interchangeable elements constructed and arranged for engagement with the insole-portions operated upon, a series of controlling devices arranged for selective actuation by the different interchangeable elements of the operating mechanism, and means under the influence of the controlling devices for governing the operation of the machine.

39. In an insole-making machine, operating mechanism including a complemental pair of a set of interchangeable pairs of elements constructed and arranged for engagement with the insole-portions operated upon, two series of controlling devices, each series being arranged for selective actuation by the different interchangeable elements of the set, and means under the influence of a controlling device of both series for governing the operation of the machine.

40. In a shoe machine, a carrier, a series of contact devices associated with the carrier, a set of pressure members any one of which may be applied to the carrier, each pressure member of the set having means to cause selective actuation of the contact devices, driving mechanism for the machine, electrical controlling means for the driving mechanism, and an energizing circuit for the controlling means and including the contact devices.

41. In a shoe machine, a carrier, a series of contact devices associated with the carrier, a set of pressure members any one of which may be applied to the carrier, each pressure member of the set having means to cause selective actuation of the contact devices, driving mechanism for the machine including a clutch, operator-governed means for engaging the clutch and including a connecting member movable into effective and ineffective positions, an electrical device arranged to move the connecting member, and a circuit including said electrical device and the contact devices.

42. In a shoe machine, a co-operating carrier and ram, series of contact devices associated with both the carrier and ram, complemental dies of a set of pairs of dies mounted upon the carrier and ram and being arranged to affect particular contacts of the series, driving mechanism for the machine, an electrical controlling device for the driving mechanism, and a circuit for the controlling device including contacts of both the carrier and ram.

43. In a shoe machine, a co-operating carrier and ram, series of contact devices associated with both the carrier and ram, complemental dies of a set of pairs of dies mounted upon the carrier and ram and being arranged to affect particular contacts of the series, driving mechanism for the machine, an electrical controlling device for the driving mechanism, and a circuit for the controlling device including contacts of both the carrier and ram, said circuit being closed only when the dies of the carrier and ram are incorrectly matched.

44. In an insole-making machine, a carrier and opposite rams co-operating therewith, series of contact devices associated respectively with the carrier and each of the rams, complemental dies of sets of such dies mounted upon the carrier and both rams and being arranged to affect particular contacts of the series, driving mechanism for the machine, an electrical controlling device for the driving mechanism, and a circuit for the controlling device including contacts of the carrier and both rams.

45. In an insole-making machine, operating mechanism including a set of pairs of complemental dies, series of contacts selectively controlled by the dies, driving mechanism for the machine including a clutch, a member movable by the operator to engage the clutch and being capable of occupying effective and ineffective positions, an electrical device arranged to shift the clutch-engaging member, and a circuit including the shifting device and contacts.

46. In an insole-making machine, operating mechanism including a set of pairs of complemental dies, series of contacts selectively controlled by the dies, driving mechanism for the machine including a clutch, a member movable by the operator to engage the clutch and being capable of occupying effective and ineffective positions, means for locking the clutch in its engaged relation, an electrical device arranged to shift the clutch-engaging member and release the locking means, and a circuit including the shifting device and contacts.

47. In an insole-making machine, a frame, a carrier guided in the frame, operating mechanisms into co-operation with which the carrier moves, means for moving the carrier including an element secured against movement upon said carrier during the operation of the machine, and means arranged to adjust the position of the element upon the carrier and thereby the normal relation of the carrier to the operating mechanisms.

48. In an insole-making machine, a movable carrier, operating mechanisms into co-operation with which the carrier moves, gearing for moving the carrier from one operating mechanism to another and including an element mounted upon said carrier, and means arranged to fix said element against movement in different positions upon the carrier.

49. In a shoe machine, the combination with a reciprocatory carrier, of operating mechanism into co-operation with which the carrier moves, a rack mounted upon the carrier, means arranged to fix the rack against movement in different positions on said carrier, and a gear for reciprocating the rack and moving the carrier from one operating mechanism to another.

50. In an insole-making machine, sewing-rib-molding dies, means for advancing the end of a web of insole-material toward the dies, and means to which the end of the web is delivered for advancing the material between the dies for the rib-molding operation.

51. In an insole-making machine, operating mechanism comprising an insole-rib-molding die, means for advancing the end of a web of insole-material for the operation upon it, means for moving said advancing means into and out of engagement with the material, and means to which the end of the web is delivered for further advancing the material.

52. In an insole-making machine, operating mechanism comprising an insole-rib molding die, means for advancing the end of a web of insole-material for the operation upon it, means to which the end of the web is delivered for further advancing the material, and means for moving the two advancing means alternately into and out of engagement with the material.

53. In a shoe machine, the combination with operating mechanism, of a reel for a web of material, a pair of rolls for engagement with the web, means for rotating the rolls to advance the web toward the operating mechanism, reciprocatory bearings for one of the rolls, an oscillatory lever, and yieldable connections between the bearings and lever.

54. In a shoe machine, the combination with a frame, of operating mechanism movable upon the frame, a reel for web-material, a pair of rolls for engagement with the web, means for rotating the rolls, a pair of feeding jaws to which the end of the web is delivered by the rolls in their rotation, and means for reciprocating the jaws upon the frame independently of the movement of the operating mechanism to advance the material toward said operating mechanism.

55. In a shoe machine, the combination with a frame, of operating mechanism movable upon the frame, a reel for web-material, a pair of rolls for engagement with the web, means for rotating the rolls, a pair of feeding jaws to which the end of the web is delivered by the rolls in their rotation, means for reciprocating the jaws upon the frame independently of the movement of the operating mechanism to advance the material toward said operating mechanism, and means for alternately moving the rolls relatively into and out of advancing engagement with the web and for opening and closing the jaws.

56. In an insole-making machine, operating mechanism, means for advancing the end of a web of insole-material for the operation upon it, means to which the end of the web is delivered for further advancing the material, actuating means for one of the advancing means, and connections to said actuating means for intermittently actuating the other advancing means, said connections including means for introducing lost motion.

57. In a shoe machine, the combination with operating mechanism, of a reel for web-material, a pair of rotatable rolls for engagement with the web, a pair of feeding jaws to which the end of the web is delivered by the rolls in their rotation, means for reciprocating the jaws to advance the material toward the operating mechanism, and connections to the reciprocating means independent of the operating mechanism for rotating the rolls.

58. In a shoe machine, the combination with operating mechanism, of a reel for web-material, a pair of rotatable rolls for engagement with the web, a pair of feeding jaws to which the end of the web is delivered by the rolls in their rotation, an oscillatory lever for reciprocating the jaws, and gearing for rotating the rolls under the influence of the lever.

59. In an insole-making machine, operating mechanism, means arranged to advance a strip of insole-material to an unvarying extent in preparation for the operation upon it, and means acting during a portion of the advance of the strip for varying the movement.

60. In an insole-making machine, operating mechanism, means arranged to advance a strip of insole-material to an unvarying extent in preparation for the operation upon it and to give an interval of rest in such advance, and means acting prior to the interval of rest for varying the movement.

61. In an insole-making machine, operating mechanism, means arranged to advance a strip of insole-material to an extent determined by a particular size of insole to be operated upon, means for modifying such movement in accordance with other sizes, and plural means independent of each other for actuating the advancing means and modifying means.

62. In a shoe machine, the combination with operating mechanism, of members arranged to engage a strip of material and advance it toward the operating mechanism, and two mechanisms for moving the engaging members, one of said mechanisms acting upon the other but being constructed and arranged to be rendered ineffective, leaving its companion to operate independently.

63. In a shoe machine, the combination with operating mechanism, of members arranged to engage a strip of material and advance it toward the operating mechanism, and two mechanisms for moving the engaging members, one of said mechanisms acting upon the other and arranged to retard its movement.

64. In a shoe machine, the combination with operating mechanism, of jaws arranged to engage one extremity only of a strip of material and advance it toward the operating mechanism, an actuating lever for the jaws, a movable fulcrum for the lever, and means operable by the machine to shift the fulcrum to different extents.

65. In a shoe machine, the combination with operating mechanism, of jaws arranged to engage a strip of material and advance it toward the operating mechanism, an actuating lever pivotally connected to the jaws, operating mechanism for the lever, a movable support furnishing a fulcrum for the lever, and operating mechanism for the support, the mechanisms acting under the power of the machine.

66. In a shoe machine, the combination with operating mechanism, of reciprocatory jaws pivoted to each other and arranged to engage a strip of material and advance it toward the operating mechanism, an actuating lever pivotally connected to the jaws to reciprocate them, operating mechanism for the lever, a movable support furnishing a fulcrum for the lever, operating mechanism for the support, and adjustable connections included between the support and its operating mechanism.

67. In an insole-making machine, operating mechanism, a reel for a web of insole-material, means for advancing the end of a web from the reel for the operation upon it, means for severing the advanced end of the web prior to the operation, means for drawing the end from the severing means, and means for lifting the severed end from the drawing means.

68. In an insole-making machine, a sewing-rib-molding die, means for advancing the end of a web of insole-material for the molding operation, means to which the end of the web is delivered for further advancing the material, and means situated between the advancing means for severing the web.

69. In an insole-making machine, a sewing-rib-molding die, means for advancing the end of a web of insole-material for the molding operation, means to which the end of the web is delivered for further advancing the material, means for moving the two advancing means alternately into and out of engagement with the material, and means operative while the second-acting advancing means is in engagement with the material for severing the web.

70. In a shoe machine, the combination with operating mechanism, of a reel for web-material, a pair of rolls for engagement with the web, means for rotating the rolls to advance the web toward the operating mechanism, means for moving the rolls relatively into and out of advancing engagement with the web, cutting mechanism movable into engagement with the web, and means acting independently of the operating mechanism for actuating the cutting mechanism when the rolls are out of engagement with the web.

71. In a shoe machine, the combination with a frame, of operating mechanism movable upon the frame, a reel for web-material, a pair of rolls for engagement with the web, means for rotating the rolls, a pair of feeding jaws to which the end of the web is delivered by the rolls in their rotation, means for reciprocating the jaws upon the frame independently of the movement of the operating mechanism to advance the material toward said operating mechanism, means for alternately moving the rolls relatively into and out of advancing engagement with the web and for opening and closing the jaws, cutting mechanism movable into engagement with the web, and means arranged to actuate the cutting mechanism when the jaws are closed.

72. In an insole-making machine, operating mechanism, means arranged to advance a strip of insole-material to an unvarying extent in preparation for the operation upon it, means acting during a portion of the advance of the strip for varying the movement, and means acting after such variation for cutting the strip.

73. In an insole-making machine, operating mechanism, means arranged to advance a strip of insole-material to an unvarying extent in preparation for the operation upon it and to give an interval of rest in such advance, means acting prior to the interval of rest for varying the movement, and means acting during the interval of rest for cutting the strip.

74. In a shoe machine, the combination with operating mechanism, of means for advancing the end of a web of material in the direction of the operating mechanism, a knife fixed transversely of the path of the web-material as it advances in web-form toward the operating mechanism, a cutting block situated at the opposite side of the web and against a surface of which the knife operates, and means for reciprocating the block.

75. In a shoe machine, the combination with operating mechanism, of means for advancing the end of a web of material toward the operating mechanism, means arranged to cut a piece of material from the end of the web, and means independent of the advancing means and fixed against bodily movement at the side of the cutting means opposite the operating mechanism for retaining against movement the end of the web from which the piece has been cut.

76. In a shoe machine, the combination with operating mechanism, of means for advancing the end of a web of material toward the operating mechanism, a knife fixed adjacent to the web, a cutting block co-operating with the knife at the opposite side of the web, means for reciprocating the block, and a yieldable member fixed with the knife and arranged to engage the end of the web upon the block.

77. In an insole-making machine, operating mechanism, means for advancing the end of a web of insole-material for the operation upon it, a knife for severing the advanced end of the web prior to the operation, and a yieldable member mounted upon the knife for retaining against reverse movement the end of the web from which the piece has been cut.

78. In an insole-making machine, operating mechanism, means for advancing the end of a web of insole-material for the operation upon it, means to which the end of the web is delivered for further advancing the material, means situated between the advancing means for severing the web, and web-retaining means associated with the severing means at the side toward the first-mentioned advancing means.

79. In a shoe machine, the combination with operating mechanism, of a reel for web-material, a pair of rotatable rolls for engagement with the web, means for rotating the rolls to advance the web toward the operating mechanism, means for moving the rolls relatively into and out of advancing engagement with the web, cutting mechanism movable into engagement with the web, means for actuating the cutting mechanism when the rolls are out of engagement with the web, and a retaining member engaging the web during the separation of the rolls.

80. In an insole-making machine, the combination with operating mechanism, of feeding mechanism therefor including traveling jaws, means for reciprocating the jaws, movable actuating means, and connections to the actuating means for opening and closing the jaws during their reciprocation.

81. In an insole-making machine, the combination with operating mechanism, of feeding mechanism therefor including a slide, a pair of jaws carried thereby, an actuating slide movable upon the carrying slide and connected to the jaws to both positively open and close said jaws, and means for reciprocating the actuating slide.

82. In an insole-making machine, the combination with operating mechanism, of feeding mechanism therefor including a slide, a pair of jaws carried thereby, an actuating slide for the jaws movable upon the carrying slide, a bar with which the actuating slide is in constant engagement, and means for moving the bar to reciprocate the actuating slide.

83. In an insole-making machine, operating mechanism, a pair of members arranged to receive an insole-piece loosely between them, means for moving the members to present the piece to the operating mechanism, and means for removing the insole-piece from between the members.

84. In an insole-making machine, a sewing-rib-molding die, a pair of members arranged to receive an insole-piece between them with its edge projecting beyond the members, and means at the die for grasping the projecting edge.

85. In an insole-making machine, operating mechanism, a pair of members arranged to receive an insole-piece between them, one of which is spaced from the other and is yieldable, and means for moving said other member into co-operation with the yieldable member and then moving the members together to deliver the piece to the operating mechanism.

86. In a shoe machine, the combination with operating mechanism having a substantially vertical operating face, of a substantially horizontal elevating member situated adjacent to the operating face, a yieldable member interposed between the elevating member and operating face, means for feeding a work-piece to the elevating member, and means for moving said member into co-operation with the yieldable member and then the two members together into proximity with the operating face.

87. In a shoe machine, the combination with a reciprocatory carrier having a substantially vertical operating face, a substantially horizontal elevating leaf, a yieldable leaf interposed between the elevating leaf and operating face, feeding mechanism delivering work-pieces to the horizontal leaf, means for raising the horizontal leaf and with it the yieldable leaf substantially parallel to the operating surface, means mounted upon the carrier for grasping the elevated piece, and means for moving the carrier with the grasped piece away from the leaves.

88. In a shoe machine, operating mechanism, a frame situated adjacent to the operating mechanism, a removable magazine-box mounted upon the frame and having a contracted opening at its bottom, a spring secured to the frame and arranged to force the magazine-box against the opposite side of the frame into a definite relation to the operating mechanism, a platform movable through the bottom-opening and arranged to elevate a stack of work-pieces, and means for transferring the pieces successively from the top of the stack to the operating mechanism.

89. In a shoe machine, operating mechanism, a frame situated adjacent to the operating mechanism, a removable magazine-box mounted upon the frame, a spring acting upon the bottom of the magazine-box to force its top against the frame into a definite relation to the operating mechanism, a platform movable in the box and arranged to elevate a stack of work-pieces, and means for transferring the pieces successively from the top of the stack to the operating mechanism.

90. In a shoe machine, operating mechanism, a frame situated adjacent to the operating mechanism, a removable magazine-box mounted upon the frame and having a contracted opening at its bottom, horizontal rails upon which the magazine-box rests in the frame, springs forcing the rails upward against the box and said box against the frame into a definite relation to the operating mechanism, a platform movable through the bottom-opening and arranged to elevate a stack of work-pieces, and means for transferring the pieces successively from the top of the stack to the operating mechanism.

91. In a shoe machine, operating mechanism, a frame situated adjacent to the operating mechanism, a removable magazine-box mounted upon the frame, yieldable means for determining the position of the magazine-box vertically and laterally of the frame with respect to the operating mechanism, a platform movable in the box and arranged to elevate a stack of work-pieces, and means for transferring the pieces successively from the top of the stack to the operating mechanism.

92. In a shoe machine, operating mechanism, a frame situated adjacent to the operating mechanism, a removable magazine-box mounted upon the frame, a retaining member arranged to hold the box in the frame in a definite relation to the operating mechanism, a platform movable in the box and arranged to elevate a stack of work-pieces, means movable with the platform for actuating the retaining member, and means for transferring the pieces successively from the top of the stack to the operating mechanism.

93. In a shoe machine, operating mechanism, a frame situated adjacent to the operating mechanism, a removable magazine-box mounted upon the frame, a retaining member for the box movable upon the frame and arranged to hold said box in a definite relation to the operating mechanism, a platform movable in the box and arranged to elevate a stack of work-pieces, a projection effective in the lower position of the platform and arranged to move the retaining member out of the path of the box to permit its removal and introduction, and means for transferring the pieces successively from the top of the stack to the operating mechanism.

94. In a shoe machine, operating mechanism, a frame situated adjacent to the operating mechanism, a removable magazine-box mounted upon the frame and having a contracted opening at its bottom, ways over which the box may be introduced into and removed from the frame, a hook pivoted upon the frame and movable into and out of the path of the box upon the ways to hold said box in a definite relation to the operating mechanism or to release it, said hook having an inclined surface, a platform movable through the bottom-opening and arranged to elevate a stack of work-pieces, a roll movable with the platform and arranged to engage the inclined surface of the hook, and means for transferring the pieces successively from the top of the stack to the operating mechanism.

95. In a shoe machine, the combination with operating mechanism, of a magazine for a stack of work-pieces situated adjacent to the operating mechanism, means for transferring the pieces from the stack to the operating mechanism, a positioning member separated from the stack during the removal of a piece therefrom but movable into contact with the upper portion of the stack, and means for moving the member into such contact prior to each transfer to arrange the work-piece to be transferred in a definite relation to the operating mechanism.

96. In a shoe machine, the combination with operating mechanism, of a magazine for a stack of work-pieces situated adjacent to the operating mechanism, means for transferring the pieces from the stack to the operating mechanism, a positioning member movable into contact with the upper portion of the stack, means for moving the member into such contact prior to each transfer to arrange the work-piece to be transferred in a definite relation to the operating mechanism and then withdrawing said member, and means for elevating the stack during such withdrawal.

97. In a shoe machine, the combination with operating mechanism, of a magazine for a stack of work-pieces situated adjacent to the operating mechanism, means for transferring the pieces from the stack to the operating mechanism, a positioning member movable into contact with the upper portion of the stack to arrange the work-piece to be transferred in a definite relation to the operating mechanism, yieldable means for producing such movement and means for moving the positioning member away from the stack.

98. In a shoe machine, the combination with operating mechanism having an operating surface corresponding in contour to a shoe-portion, of a magazine for a stack of shoe-portions situated adjacent to the operating mechanism, means for transferring the portions from the stack to the operating mechanism, a positioning member movable into contact with the upper portion of the stack, yieldable means for producing such movement, and connections for the member arranged to cause its travel to correspond to the form of the portion with which it is to contact.

99. In a shoe machine, the combination with operating mechanism having an operating surface corresponding in contour to a shoe-portion, of a magazine for a stack of shoe-portions situated adjacent to the operating mechanism, means for transferring the portions from the stack to the operating mechanism, positioning members movable into contact with the upper portion of the stack, means for moving the members into such contact prior to each transfer, and connections for the members arranged to cause their travel to correspond to the form of the portions with which they are to contact.

100. In an insole-making machine, operating mechanism, a magazine for a stack of insole-pieces situated adjacent to the operating mechanism, a positioning member movable into contact with the stack, and connections acted upon by an element of the operating mechanism for moving the member.

101. In an insole-making machine, operating mechanism, a magazine for a stack of insole-pieces situated adjacent to the operating mechanism, positioning members movable into contact with the stack, connections acted upon by an element of the operating mechanism for moving the members away from the stack, and a spring acting to move the members toward the stack.

102. In a shoe machine, the combination with a movable pressure member, of actuating connections therefor, a magazine for a stack of work-pieces, means for transferring pieces from the stack to receive the action of the pressure member, positioning members movable into and out of contact with the stack, and means carried by the connections for the pressure member for moving the positioning members.

103. In a shoe machine, the combination with a movable pressure member, of actuating connections therefor, a magazine for a stack of work-pieces, means for transferring pieces from the stack to receive the action of the pressure member, positioning members movable into and out of contact with the stack, a spring arranged to draw the positioning members into contact with the stack, and means carried by the connections for the pressure member for moving the members away from the stack.

104. In an insole-making machine, the combination with operating mechanism including a sewing-rib-molding die, of a magazine for insole-portions, means for transferring portions from the magazine to the operating mechanism, and levers movable through different distances against the opposite sides of each piece prior to its transfer and to an extent determined by the form of the portions.

105. In an insole-making machine, the combination with operating mechanism including a sewing-rib-molding die, of a magazine for insole-portions, means for transferring portions from the magazine to the operating mechanism, and levers movable against the opposite sides of each portion at both the heel and forepart prior to its transfer.

106. In an insole-making machine, the combination with operating mechanism including a sewing-rib-making die, of a magazine for insole-portions, means for transferring portions from the magazine to the operating mechanism, and levers movable against the heel- and toe-ends and at opposite sides of both the heel and forepart of each portion prior to its transfer.

107. In a shoe machine, the combination with operating mechanism, of a magazine for work-pieces, means for transferring pieces from the magazine to the operating mechanism, a lever movable against each piece prior to its transfer, a spring arranged to produce such movement, an oscillatory shaft, an arm carried by the shaft, connections between the arm and lever arranged to both move the lever away from the stack and to permit the spring to act, and actuating connections between the operating mechanism and shaft.

108. In a shoe machine, the combination with operating mechanism, of a magazine for work-pieces, means for transferring pieces from the magazine to the operating mechanism, a plurality of levers connected to each other and movable against each piece prior to its transfer, a spring arranged to produce such movement, an oscillatory shaft, an arm carried by the shaft, and connections between the arm and levers arranged to both move the levers away from the stack, and means controlled by the operating mechanism for turning the shaft.

109. In a shoe machine, the combination with operating mechanism, of a magazine for work-pieces, means for transferring pieces from the magazine to the operating mechanism, a lever movable against each piece prior to its transfer, a spring arranged to produce such movement, an oscillatory shaft, an arm carried by the shaft, connections between the arm and lever arranged to both move the lever away from the stack and to permit the spring to act, a second arm carried by the shaft, and a projection from the operating mechanism engaging said second arm.

110. In a shoe machine, the combination with operating mechanism having a substantially vertical operating surface, of a container in which work-pieces rest in a horizontal position, and a transferring member constructed and arranged to lift a piece from the container and press it against the vertical operating surface.

111. In a shoe machine, the combination with operating mechanism having a substantially vertical operating surface, of a container in which work-pieces rest in a horizontal position, and a suction device constructed and arranged to engage a horizontal piece in the container and transfer it to the vertical operating surface.

112. In a shoe machine, the combination with operating mechanism, of a container for work-pieces, a transferring device movable between the container and operating mechanism and having a piece-engaging portion, means for moving the transferring device in a plurality of directions, and means for moving the engaging portion upon the transferring device during the transferring movement thereof.

113. In a shoe machine, the combination with operating mechanism, of a container for work-pieces, a transferring device movable between the container and operating mechanism and having a piece-engaging portion, means for moving the transferring device vertically and horizontally, and means for oscillating the engaging portion of the transferring device during the transferring movement thereof.

114. In a shoe machine, the combination with operating mechanism having a vertical pressure-plate, of a container for work-pieces arranged horizontally, a suction-conduit movable between the container and operating mechanism, and a suction-head movable upon the conduit from a position in which its opening is parallel to a piece in the magazine to one in which it is parallel to the plate.

115. In a shoe machine, the combination with operating mechanism, of a container for work-pieces, a suction-conduit movable between the container and operating mechanism, a suction-head movable upon the conduit, means for reciprocating the conduit to carry the head into and out of engagement with pieces in the container, means for reciprocating the conduit to deliver the engaged pieces to the operating mechanism, and means for oscillating the head upon the conduit to present it respectively to the container and operating mechanism.

116. In a shoe machine, the combination with operating mechanism, of a container for work-pieces, a suction-conduit movable between the container and operating mechanism, pivoted arms upon which the conduit is supported, means for raising and lowering the pivot of one of the arms, and connections arranged to oscillate another arm.

117. In a shoe machine, the combination with operating mechanism, of a container for work-pieces, a suction-conduit movable between the container and operating mechanism, pivoted arms upon which the conduit is supported, a lever carrying the pivot of one arm and fulcrumed with the pivot of another arm, means for oscillating the last-mentioned arm, and means for oscillating the lever.

118. In a shoe machine, the combination with operating mechanism, of a container for work-pieces, a suction-conduit movable between the container and operating mechanism, pivoted arms upon which the conduit is supported, a lever carrying the pivot of one arm and fulcrumed with the pivot of another arm, means for oscillating the last-mentioned arm, means for oscillating the lever, a suction-head turning upon the conduit, and means for oscillating the head.

119. In an insole-making machine, a frame provided with ways, a carrier arranged to reciprocate upon the ways and having a molding section and an assembling section, each section being provided with a recess, and a ram movable into co-operation with both sections and having a projection arranged to enter both recesses and retain the carrier against displacement in its ways during the respective operations.

120. In an insole-making machine, a carrier having a molding section and an assembling section, a reciprocatory ram cooperating with both sections of the carrier, an electrical heating unit carried by the ram, sliding contacts through which current is delivered to the unit, and a thermostat upon the ram included in the heating circuit.

121. In a shoe machine, the combination with pressure mechanism, of means for causing said mechanism to perform plural operations, work-ejecting means carried by the pressure mechanism, and means arranged to operate the ejecting means for but a portion of the plural operations.

122. In a shoe machine, the combination with pressure mechanism, of means for causing said mechanism to perform plural operations, work-ejecting means carried by the pressure mechanism, and actuating means for the ejecting means movable into active position for but a portion of the plural operations.

123. In an insole-making machine, pressure mechanism, means for causing the pressure mechanism to alternately perform molding and assembling operations, a work-ejecting member movable upon the pressure mechanism, and means arranged to move the ejecting member only after the assembling operation.

124. In a shoe machine, the combination with a movable carrier having a plurality of operating sections, of a pressure-ram co-operating with the sections, a work-ejecting device carried by the ram, and means controlled in the movement of the carrier for rendering the ejecting device effective.

125. In an insole-making machine, a reciprocatory ram, a carrier movable to present a molding section and an assembling section to the ram, an ejector carried by the ram and contacting with the work, and an actuating member for the ejector movable into active position by the carrier upon arrival at the assembling position.

126. In an insole-making machine, a reciprocatory ram, a carrier movable to present a molding section and an assembling section to the ram, an ejector carried by the ram and contacting with the work, and an actuating member for the ejector movable into active position by the carrier upon arrival at the assembling position, said actuating member being arranged to move the ejector only upon the travel of the ram away from the carrier.

127. In a shoe machine, the combination with a carrier, of a reciprocatory ram, a work-ejecting plunger movable upon the ram, a connecting member movable upon the ram and contacting with the plunger, and an actuating member movable into and out of the path of the connecting member.

128. In a shoe machine, the combination with a carrier, of a reciprocatory ram, a work-ejecting plunger movable upon the ram, a connecting member arranged to reciprocate and oscillate upon the ram, and an actuating member contacting with the connecting member to cause both its reciprocation and oscillation.

129. In a shoe machine, the combination with a movable carrier, of a reciprocatory ram, a work-ejecting plunger movable upon the ram, a connecting member movable upon the ram and contacting with the plunger, and an actuating member movable by the carrier into co-operation with the connecting member.

130. In a shoe machine, the combination with a movable carrier, of a reciprocatory ram, a work-ejecting plunger movable upon the ram, a connecting member movable upon the ram and contacting with the plunger, an actuating member movable by the carrier into co-operation with the connecting member, and means for moving the connecting member away from the actuating member.

131. In a shoe machine, the combination with a movable carrier, of a reciprocatory ram, a work-ejecting plunger movable upon the ram, a connecting member movable upon the ram and contacting with the plunger, an actuating member movable by the carrier into co-operation with the connecting member, and means made effective in the travel of the ram for moving the connecting member away from the actuating member.

In testimony whereof I have signed my name to this specification.

ERIC A. HOLMGREN.